(12) United States Patent
Roque et al.

(10) Patent No.: US 7,103,037 B2
(45) Date of Patent: Sep. 5, 2006

(54) METHOD AND SYSTEM FOR THE MANAGEMENT OF SIGNALING GATEWAYS AND SIGNALING GATEWAY PROCESSES IN TRANSPORT OF SCN SIGNALING OVER DATA NETWORKS

(75) Inventors: Antonio Roque, Meco (ES); Santiago Muñoz, Madrid (ES); Manuel Cardeno, Fuenlabrada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1016 days.

(21) Appl. No.: 10/155,439

(22) Filed: May 24, 2002

(65) Prior Publication Data

US 2002/0186687 A1 Dec. 12, 2002

(30) Foreign Application Priority Data

May 25, 2001 (EP) .................................. 01201953

(51) Int. Cl.
*H04L 12/66* (2006.01)
(52) U.S. Cl. ...................................... 370/356; 370/401
(58) Field of Classification Search ........ 370/252–258, 370/360, 373, 377, 384, 385, 386, 389, 401, 370/402
See application file for complete search history.

(56) References Cited

U.S. PATENT DOCUMENTS

| 5,898,672 | A | | 4/1999 | Ginzboorg | .................. 370/236 |
| 5,995,606 | A | * | 11/1999 | Civanlar et al. | ....... 379/207.13 |
| 6,128,379 | A | * | 10/2000 | Smyk | ......................... 379/230 |

FOREIGN PATENT DOCUMENTS

WO WO 01/31842 A2 5/2001

WO WO 01/35601 5/2001

OTHER PUBLICATIONS

European Search Report, App. No. EP 01201953, Oct. 30, 2001, pp. 1-3.
Ong et al., "Framework Architecture for Signaling Transport," Network Working Group, Request for Comments: 2719, The Internet Society, pp. 1-24, (Oct. 1999).
R. Stewart et al., "Stream Control Transmission Protocol," Network Working Group, Request for Comments: 2960, The Internet Society, pp. 1-134, (Oct. 2000).
K. Morneault et al., "ISDN Q.921—User Adaptation Layer," Network Working Group, Request for Comments: 3057, The Internet Society, pp. 1-66, (2001).
K. Morneault et al., "SS7 MTP2-User Adaptation Layer," Network Working Group, Internet Draft, The Internet Engineering Task Force, pp. 1-94, (Feb. 2001).
G. Sidebottom et al., "SS7 MTP3-User Adaptation Layer (M3UA)," Network Working Group, Internet Draft, The Internet Engineering Task Force, pp. 1-128, (Feb. 2001).

* cited by examiner

*Primary Examiner*—Brenda Pham
(74) *Attorney, Agent, or Firm*—Roger S. Burleigh

(57) ABSTRACT

Method and system to manage the state maintenance and the traffic maintenance of a Signalling Gateway Process (SGP), and of the corresponding Signalling Gateway (SG) or SGs served by such SGP, in scenarios where traditional Switched Circuit Network (SCN) signalling is transported over data networks, such as IP-networks. The method and the system for implementing the method involve defining a set of messages exchanged between a SGP and one or a set of concerned (connected) Application Server Process (ASP); driving the corresponding state-machines by the reception of such messages; and defining procedures for sending such messages and for receiving such messages. These messages can, optionally, convey also information about the destination routing parameters served by the SGP that become available or unavailable in the SCN through such SGP.

28 Claims, 14 Drawing Sheets

METHOD AND SYSTEM FOR THE MANAGEMENT OF SIGNALING GATEWAYS AND SIGNALING GATEWAY PROCESSES IN TRANSPORT OF SCN SIGNALING OVER DATA NETWORKS

TECHNICAL FIELD OF THE INVENTION

The present invention relates to management methods applicable to the state maintenance and traffic maintenance between an Application Server Process (ASP) and a Signaling Gateway Process (SGP), in scenarios where traditional Switched Circuit Network (SCN) signaling is transported over data networks, such as IP-networks.

More specifically, it relates to the management procedures for state maintenance and traffic maintenance of SGP(s) and the corresponding Signaling Gateway (SG) or SGs served by such SGP(s).

BACKGROUND

There is an ongoing integration trend between Switched Circuit Networks (SCN) and Internet Protocol (IP) networks that, using the effective way to transport user data provided by IP networks, intends to get a less restrictive and network independent way of providing and deploying telecommunication services.

The term SCN is used in this invention to refer to a network that carries traffic (normally, telephony traffic) within channeled bearers of pre-defined sizes. Examples of SCN include Public Switched Telephone Networks (PSTN), Integrated Services Digital Networks (ISDN) or Public Land Mobile Networks (PLMNs), such as a Global System for Mobile communications (GSM) network.

The term IP network is used in this invention to refer to a network that carries traffic (normally, data traffic) within data packets. The term Data Network can also be used across this invention to refer to this kind of packet oriented network.

A goal in such integration trend is to grant inter-operation between endpoints (signaling end-points or voice/multimedia terminal devices) allocated in SCN and in IP networks.

Other goals in such integration trend is to allow allocation of nodes/functions, traditionally located in the SCN, into the IP network; thus allowing telecommunication operators to expand their networks and to speed up the deployment of new or existing services. An example could be the allocation of a Global System for Mobile communications (GSM) node, such as Home Location Register (HLR) node, into an IP network.

In this context, the transport of traditional SCN signaling protocols over IP networks was viewed as one of the main areas of concern and was addressed by the Signaling Transport (SIGTRAN) Working Group of the Internet Engineering Task Force (IETF). The intention of SIGTRAN Working Group is to define an architecture and related protocols to support transport of SCN signaling over IP in order to provide a smooth and transparent interworking between telecommunication nodes regardless their allocation: SCN or IP network.

Examples of traditional SCN signaling protocols regarded to be transported over IP networks are: Q.931; Signaling System Number 7 (SS#7) Message Transfer Part (MTP); MTP layer-3 (MTP3) user-part protocols, like Integrated Service Digital Network User Part (ISUP) or Signaling Connection Control Part (SCCP); SCCP-user protocols, like Mobile Application Part (MAP) over Transaction Capabilities Application Part (TCAP); etc.

In this scenario, two kinds of nodes were identified by SIGTRAN: nodes performing functions related to signaling conversion, named Signaling Gateways (SGs), intended to provide an interwork between nodes located in the SCN and nodes located in the IP network; and nodes performing functions related to signaling application located in the IP network (IP-located nodes), named Application Servers (ASs).

These nodes (SGs and ASs) can, depending on the approach, be seen as physical or just functional (logical) entities.

There are, however, some ambiguous definitions in SIGTRAN drafts related to the physical or logical condition related to the terms: SG and AS. So, sometimes the terms SG or AS are used to refer to the physical machine (host) where, respectively, the SG or AS functionality is implemented; and sometimes the same terms are used to refer to the logical entity that implements, respectively, the SG or AS functions, regardless if such SG and/or AS functions are carried out by means of one or more SG-hosts and AS-hosts.

Hereinafter, in this invention the terms SG (or the term SG-node) and AS (or the term AS-node) will be used to refer, to the logical entity that performs, respectively, an SG function and an AS function, regardless if such functions (SG or AS) are distributed over one or more hosts each; and the terms SG-host and AS-host will be used to refer to physical entity (physical machine or physical node) that, respectively, implements (contains) an SG function and an AS function.

Therefore, the term SG can coincide in this invention with the term SG-host if the SG is not distributed across of more than one SG-host.

In the same way, the term AS can coincide in this invention with the term AS-host if the AS is not deployed across of more than one AS-host.

According to SIGTRAN definitions, an ASP and an SGP are processes instances that implements, respectively, the functionality of an AS and of an SG. That is to say: In an SG node, a specific process instance performing the specific SG functionality is called Signaling Gateway Process (SGP). Similarly, in a AS node, a specific process instance performing the specific AS functionality is called Application Server Process (ASP).

In addition to this, and in order to avoid a single point of failure, an AS may be comprised of one or more ASPs distributed over one or more physical hosts using an active/standby or load-sharing traffic handling mode. Besides to this, and as explicitly defined in some SIGTRAN drafts, an ASP can be configured to process signaling traffic related to more than one AS (i.e.: to serve to more than one AS).

Much like the AS model, an SG may also be comprised of one or more SGPs distributed over one or more physical hosts using an active/standby or load-sharing traffic handling mode.

However, no explicit reference is given in SIGTRAN drafts about that a given SGP can be configured to process signaling traffic related to more than one SG (i.e.: to serve to more than one SG), and no reference at all is given about how such SGP configuration data can be known and handled in the ASPs.

Examples of ASPs are process of Media Gateway Controller (MGC), IP-based Service Control Point (SCP, node of Intelligent Networks), or IP-based Home Location Register (HLR, node of GSM networks).

The internet-standard defining the general architecture for SIGTRAN (RFC2719) specifies a set of 3 elements that would have to be implemented by any node involved in the transport of SCN signaling over IP networks (SG and AS), and that will have to be performed by the process(es) that implement its functionality (ASPs and SGPs).

These elements are intended to interact each other in a layered way within the same node's serving process (SGP or ASP), and each one of them is intended to communicate with its respective peer element in the interworking node's serving process (SGP or ASP) by using the services provided by the adjacent lower element in its node.

These elements (from top to bottom in the aforementioned layered structure within the same node) are: the SCN adaptation module, the Common Signaling Transport and the standard IP transport.

The first element (the SCN adaptation module) is intended to be specific for the type of SCN protocol to be transported; being the latest two elements (the Common Signaling Transport and the standard IP transport) intended to be common regardless of the SCN protocol to be transported.

For this extent, SIGTRAN Working Group has developed a set of internet-standards (although some of them are still internet-drafts) that define: a set of User Adaptation layers (UA) (one per type of SCN protocol to be transported), that implements the aforementioned SCN adaptation module; and a transport protocol, the Stream Control Transmission Protocol (SCTP, defined in internet standard RFC2960) to be used over IP (instead of other well known transport protocol such as: Transmission Control Protocol TCP or User Datagram Protocol UDP), that implements the aforementioned Common Signaling Transport, and that is able to run directly over IP.

So, the final structure of a SGP⇆ASP communication is: UA-specific-protocol over SCTP over IP (UA/SCTP/IP).

Regarding more specifically User Adaptation layers (UA), SIGTRAN is defining, among others, four internet-drafts:

SS7 MTP3-User Adaptation Layer: ("draft-ietf-sigtran-m3ua") (M3UA)

SS7 MTP2-User Adaptation Layer ("draft-ietf-sigtran-m2ua") (M2UA)

ISDN Q.921-User Adaptation Layer ("draft-ietf-sigtran-iua") (IUA)

SS7 SCCP-User Adaptation Layer ("draft-ietf-sigtran-sua") (SUA)

Each aforementioned UA draft defines its specific messages, to be exchanged between the UA layer in an SGP and the corresponding peer UA layer in an ASP, and the related procedures.

Although there is one UA draft per SCN protocol to be transported over IP-networks, some messages (and related procedures) are common for all UA layers.

These common messages belong to a set of defined management messages (named MGMT messages), and to a set of defined maintenance messages (named Application Server Process Maintenance messages, or ASPM messages).

Therefore, MGMT and ASPM sets of messages have to be supported and implemented in all nodes involved in the transport of SCN signaling (SG or AS) by the UA layers of serving processes (regardless its process type: SGP or ASP).

Additionally a set of addressing abstractions have been defined to be used in ASPM messages in order to represent and identify the signaling end-points allocated in the IP network.

These addressing abstractions identifies the range of signaling traffic that is to be handled by each AS; or in other words, the range of SCN routing parameters that are handled in the IP network by each specific AS; and are used to route incoming SCN messages received in a Signaling Gateway serving process (SGP) to the corresponding Application Server serving process (ASP) that is serving to the AS identified by the SCN routing parameter(s) in the incoming message.

So, each AS is uniquely identified in an SGP by means of an addressing abstraction that, in turn, represents a determined set of SCN routing parameters. In this context, if a specific ASP wants explicitly to specify it is serving to a specific AS (or set of ASs), such ASP includes the corresponding addressing abstraction(s) that represent to such AS(s) in the corresponding ASPM message sent to the SGP.

Examples of such addressing abstractions are Routing Context (RC) (used in ASPM messages by M3UA and SUA), and Interface Identifier (II) (used in ASPM messages by M2UA and IUA).

A Routing Context (RC) is an integer that uniquely identifies a certain set of SS#7 routing parameters (such as OPC, DPC, SIO, SSN, CIC_range, etc.) and routing parameters values.

A given set of such routing parameters and parameter values is known in SIGTRAN terminology as Routing Key (RK); and there is established a one-to-one relationship between a RC and RK.

An Interface Identifier (II) is an integer or text that identifies a physical interface at the SG for which the signaling messages are sent and received.

Regarding more specifically to the defined ASPM set of messages, such set is further divided into two sub-set of messages: Application Server Process State Maintenance messages (ASPSM messages), and Application Server Process Traffic Maintenance messages (ASPTM messages).

The set of mandatory ASPSM messages, together with its meaning, is given below:

ASPUP. Sent from the UA layer in an ASP to the peer UA layer in an SGP to indicate that it is ready to receive and to send maintenance messages.

ASPUP-ACK. Acknowledgement for ASPUP message, sent from the UA layer in the SGP to the peer UA layer in the ASP.

ASP-DOWN. Sent from the UA layer in an ASP to the peer UA layer in an SGP to indicate that it is not ready to receive nor to send maintenance messages.

ASPDOWN-ACK. Acknowledgement for ASPDOWN message, sent from the UA layer in the SGP to the peer UA layer in the ASP.

The set of ASPTM messages, together with its meaning, is given below:

ASPAC. Sent from the UA layer in an ASP to the peer UA layer in an SGP to indicate that it is active and ready to process signaling traffic for a particular AS(s), the AS(s) being identified by RC(s) parameter(s) or II(s) parameter(s) included in the message.

ASPAC-ACK. Acknowledgement for ASPAC message, sent from the UA layer in the SGP to the peer UA layer in the ASP.

ASPIA. Sent from the UA layer in an ASP to the peer UA layer in an SGP to indicate that it is not active nor ready to process signaling traffic for a particular AS(s), the AS(s) being identified by RC(s) parameter(s) or II(s) parameter(s) included in the message.

ASPIA-ACK. Acknowledgement for ASPIA message, sent from the UA layer in the SGP to the peer UA layer in the ASP.

PRIOR ART SOLUTIONS

As cited above, the ASPM messages defined by the IETF SIGTRAN Working Group are intended to manage the state maintenance of an ASP (ASP state maintenance, or ASPSM, messages), and to manage the traffic maintenance of an ASP (ASP traffic maintenance, or ASPTM, messages) in all User Adaptation (UA) layers (M3UA, M2UA, IUA and SUA) by means of sending messages related to such state maintenance and traffic maintenance from the UA layer in an ASP to the corresponding peer UA layer in an SGP.

However, there is no UA messaging nor procedures defined by SIGTRAN regarding the state maintenance nor the traffic maintenance of an SGP.

Besides, the knowledge in an ASP about what destinations in the SCN can be reached through what SGP, is based exclusively on manual configuration of data in the ASP. That means that, when an ASP is brought into operation, it opens an SCTP-association towards the same SGP(s)'s transport address(es) and expect that each SGP route traffic towards the SCN destinations it had pre-configured per SGP.

So, if such kind of data changes (for instance, because certain SCN destinations are to be reached through SGP-y instead of through SGP-x), the ASP must be withdrawn from traffic, reconfigured, and then brought again into operation. This can be the case where, for instance, certain SCN destinations are to be reached through SGP-y instead of through SGP-x; where this situation can depend on different factors, such as: SGPs from different network operators with different policy prices, reconfiguration of certain SGPs, etc.

In the present state-of-the-art in SIGTRAN UA standards, the knowledge in an ASP about the availability or unavailability status of an SGP leans on the status of the SCTP-association established between an ASP and an SGP: whenever such SCTP-association exists, then the SGP is "assumed" to be available.

Another state-of-the-art technique in the present SIGTRAN UA standards that can be used by an ASP to determine the availability/unavailability status of an SGP is based on heartbeat detection: whenever a ASPSM message HEARTBEAT is acknowledged in time with the corresponding message HEARTBEAT-ACK, then the ASP can "assume" the SGP as available.

However, as stated in SIGTRAN UA standards, the message HEARTBEAT is optional to be sent, and it is intended where the UA protocol runs over a transport layer other than the SCTP (which has its own heartbeat). This implies an additional drawback given that most (if not all) commercially available implementations will run over SCTP, then, most of such implementation will not implement the sending of a fully redundant message.

Nevertheless, there are some common drawbacks for both aforementioned state-of-the-art solutions (SCTP-association status and heartbeat detection): for the time by the status of an SCTP-association is detected to be down, or, by using the heartbeat technique, there is a time-out for reception of message HEARTBEAT-ACK, it can be too late, since previous messages sent from the ASP to the SGP could have been lost in the SG without reaching their destination in the SCN, and also some messages from the SCN could have been lost in the SG without reaching their destination in the IP-based node (AS).

In short: even though in the present SIGTRAN UA standards, cover fail-over procedures and redundancy models for ASP, the method and means to cover fail-over in redundancy models for SGP are not regarded.

An insufficient exception for this is the UA standard regarding MTP3 (M3UA). It cites a redundancy model for SGP, but without providing any method—except by manual configuration—for an ASP to know if it is possible to switch over an alternative SGP (i.e.: if the same SCN destinations can be reached from the alternative SGP), and without providing any reliable method—except the aforementioned based on SCTP connection failure—that allows the SGP unavailability be discovered in the ASP.

This leads to a non-smooth operation in case of an SGP has to get (temporarily or definitively) out of service due to, for instance, configuration changes.

SUMMARY OF THE INVENTION

It is an object of the present invention to provide the methods and means to manage the state maintenance and the traffic maintenance of an SGP, so that, in case an SGP has to withdraw the service it provides to one or more ASPs, or it wants to provide such service, these events can be both indicated to the concerned ASP(s) and managed in such ASP(s) in order to establish, activate or use in such ASP(s) alternative associations with other SGP that can provide connectivity with the same end-points in the SCN.

It is also an object of the present invention to provide the methods and means that will allow to communicate from an SGP to an ASP the SCN destinations that can be served from such SGP and, therefore, that can be reached from the ASP via such SGP.

It is also an object of the present invention to provide the methods and means that will allow to an ASP to notify the status of certain SG (or SGs) to the SGP (or SGPs) that are currently serving to such SG(s).

In this invention the terms SG (or SG node) and AS (or AS node) will be used to refer to the logical entity that performs, respectively, an SG function and an AS function, regardless if such functions (SG or AS) are distributed over one or more hosts each; and the terms SG-host and AS-host will be used to refer to physical entity (physical machine or physical node) that, respectively, implements an SG function and an AS function.

Therefore, the term SG can coincide in this invention with the term SG-host if the SG is not distributed across of more than one SG-host.

In the same way, the term AS can coincide in this invention with the term AS-host if the AS is not deployed across of more than one AS-host.

In this invention the term "connected", when applied to an ASP or to an SGP, refers to a transport connection (e.g.: an SCTP association) established between an SGP and an ASP. So, when referring to "an ASP connected to an SGP" (or vice-versa), it shall be understood as referred to an ASP and an SGP that has a bi-directional transport connection established between them for the exchanging of messages.

In this invention we will also use the terms 'SGP/SGs configuration' and 'SGPs/SGs configurations' to refer to the one or more Signaling Gateways served by one or more Signaling Gateway Processes. Similarly we will also use the terms 'ASP/ASs configuration' and 'ASPs/ASs configurations' to refer to the one or more Application Servers served by one or more Application Server Processes.

According to a first aspect of the present invention there is provided a method for managing the state maintenance and the traffic maintenance of an SGP, the method comprising the following steps:

(a) Transmitting signaling data about state maintenance and traffic maintenance events from the UA layer within an SGP to corresponding peer UA layer within an ASP; the transmitted signaling data comprising a message class (MC) that identifies a message related to state maintenance or traffic maintenance of an SGP, a message identifier (MI) for identifying the type of notification sent among: up, down, active and inactive; and, optionally, a set of additional information elements that identify and/or characterize one or more SG(s) served by the sending SGP (the SGP/SGs configuration), as well as the traffic handling mode (THM) per SG served by the sending SGP, that identifies how traffic is balanced and/or handled between the SGP(s) that serves a certain SG.

(b) Storage in an ASP, per SGP, of the status of each SGP (down, active, inactive) that result from the reception of state maintenance and traffic maintenance related to such SGPs; such storage optionally comprising storage of additional information related to the SGP/SGs configuration, and the storage of the SGP status split per SG served by such SG.

(c) Storage in an ASP, per SG, of status for such SGs that results from the individual status of the SGP(s) that serve each SG; such storage optionally comprising storage of additional information related to such SG and related to the SGP(s) that are serving such SG.

(d) Optionally, transmitting signaling data from the UA layer within an ASP to the corresponding peer UA layer within an SGP about acknowledgement of state maintenance and traffic maintenance events previously received from such SGP; the transmitted signaling data for acknowledgement comprising a message class (MC) that identifies a message related state maintenance or traffic maintenance of an SGP, a message identifier (MI) for identifying the type of notification acknowledgement sent among: up-acknowledge, down-acknowledge, active-acknowledge and inactive-acknowledge; and a set of additional information elements among the ones received in the previous notification that is now acknowledged.

(e) Optionally, transmitting signaling data from the UA layer within an ASP to the corresponding peer UA layer within an SGP about notification of status concerning to the SG(s) such SGP is serving; the transmitted signaling data comprising a message class (MC) that identifies a message related to notification management, a message identifier (MI) for identifying the type of notification sent among: SG active, SG inactive, insufficient SGP resources, and alternate SGP active; and a set of additional information elements that identify one or more SG(s) served by the SGP that receives the notification.

The method being applicable to different UA protocols, such as M3UA, M2UA, IUA and SUA; wherein the UA layer implementing one of these UA protocols in an SGP, communicates with the corresponding peer UA layer implementing the same protocol in an ASP by means of a transport connection established through a data network with a transport protocol among: SCTP, TCP or UDP, or other suitable transport protocol.

According to a second aspect of the present invention, there is provided a system for managing the state maintenance and the traffic maintenance of an SGP, the system system comprising SGPs and ASPs having the following means:

(a) Protocol communication means in the UA layer of an SGP and in the UA layer of an ASP for transmitting signaling data, by means of messages, about the state maintenance and traffic maintenance events related to an SGP, between an SGP and an ASP that is connected to it by way of a previously established transport connection over a data network, the protocol communication means:

(a1) allowing transmission of state maintenance and traffic maintenance messages from the SGP to the ASP (or ASPs) related to state maintenance and traffic maintenance events related to the SGP; the messages conveying information about the present state of the SGP, as well as optional information elements that identify and/or characterize one or more SG(s) served by the sending SGP, as well as the traffic handling mode (THM) per SG served by the sending SGP, that identifies how traffic is balanced and/or handled between the SGP(s) that serves a certain SG.

(a2) allowing transmission of acknowledgement messages from the ASP to the SGP about the reception of such state maintenance and traffic maintenance messages; the acknowledgements messages conveying the optional information elements that were received in the acknowledged message and that are, explicitly, acknowledged.

(a3) allowing transmission of notification messages from the ASP to the SGP related to notification of status that concern to the SG(s) such SGP is serving; the notification messages conveying information about the present status of the SG(s), as well as optional information elements that identify one or more SG(s) served by the sending SGP to which the notification message concerns.

(b) Protocol control means in an SGP and in an ASP for requesting sending of messages to the aforementioned protocol communication means, and for receiving indications of reception of messages from the protocol communication means; the protocol control means comprising:

(b1) request parameters, to identify the message to be sent and its content; and indication parameters, to identify the received message and its content;

(b2) mapping functions in an SGP and in an ASP to coordinate a request from the protocol control means with the use of the protocol communication means for sending a specific message and specify its content, and to coordinate the reception of a message from the protocol communication means with the use of the protocol control means for indicating the reception of such message and its content;

(c) Storage means in an ASP to store, per SGP, the status of each SGP that result from the reception of state maintenance and traffic maintenance related to such SGPs; such storage means optionally comprising storage of additional information related to one or more SG(s) that are served by SGP, and the storage of the SGP status split per SG served by such SGP.

(d) Storage means in an ASP to store, per SG, the status for such SGs that results from the individual status of the SGP(s) that serve each SG; such storage means optionally comprising storage of additional information related to such SG and related to the SGP(s) that are serving such SG, and optionally comprising storage of the minimum number of active SGPs required to serve each SG.

(e) Optional configuration means in an ASP for assigning values in such ASP, in a per SG basis, about the minimum number of active SGPs required to serve each SG;

(f) Optional configuration means in an SGP for assigning values in such SGP to a set of information elements that define (identify and/or characterize) the SG(s) such SGP is configured to serve.

(g) Optional storage means in an SGP for storing the set of information elements that define the SG(s) such SGP is configured to serve.

(h) Process control means in an SGP for managing internal availability events in such SGP, an in the SG-host where it resides, with the purpose of:

(h1) handling the protocol control means for the sending state maintenance and traffic maintenance messages, related to such SGP, to a connected ASP, and handling the optional storage means in such SGP for determining the content of such messages;

(h2) handling the protocol control means for the reception of acknowledgement messages from a connected ASP about state maintenance and traffic maintenance messages previously sent to such ASP; and (h3) further handling the protocol control means for the reception of notification messages from a connected ASP related to notification of status that concern to the SG(s) such SGP is serving, for managing the availability events related to such SG(s).

(i) Process control means in an ASP for:

(i1) handling the protocol control means for the receiving state maintenance and traffic maintenance messages from a connected SGP, related to such SGP, and handling the storage means in such ASP for storing the outcome and content of such messages with the purpose of managing the availability events from the connected SGP(s);

(i2) handling the protocol control means for the sending of acknowledgement messages to a connected SGP about state maintenance and traffic maintenance messages previously received from such ASP;

(i3) handling the protocol control means for the sending of notification messages to a connected SGP related to notification of status that concern to the SG(s) such SGP is serving;

The system being suitable to be used with different UA protocols, such as M3UA, M2UA, IUA and SUA; wherein the UA layer implementing one of these UA protocols in an SGP, communicates with the corresponding peer UA layer implementing the same protocol in an ASP by means of a transport connection established through a data network with a transport protocol among: SCTP, TCP or UDP, or other suitable transport protocol; the complete system comprising: at least one SG node comprised of (served by), at least, one SGP implementing the aforementioned means and functions for an SGP; and, at least, one AS node comprised of (served by), at least, one ASP implementing the aforementioned means and functions for an ASP.

The invention will be defined according to two embodiments:

According to a first embodiment of the present invention, an SGP will send to all the ASPs connected to it notifications related to availability events in such SGP. The sending of such SGP availability information can be carried out by means of confirmed flow, thus the ASP(s) receiving such notifications will answer back to the sending SGP with a confirmation (acknowledgement) that such SGP availability information has been received.

The SGP availability information, to be sent from an SGP to one or more ASP, will, more precisely, be related to the state maintenance in such SGP (SGP state maintenance notifications, also noted as SGPSM), notifying if the SGP is "up" or "down"; and to the traffic maintenance in such SGP (SGP traffic maintenance notifications, also noted as SGPTM), notifying if the SGP is "active for traffic" or "inactive for traffic".

Such SGP state maintenance notifications (SGPSM) and SGP traffic maintenance notifications (SGPTM) can further contain additional information (AI) that can convey configuration data pertaining to the sending SGP, and, more precisely, information related to the SG(s) such SGP is configured to serve. That is to say, the AI can convey information related to the SCN destinations that can be reached through such SGP, and/or how traffic will be shared between this SGP and other SGPs that serve connections to the same destinations in the SCN (i.e.: that serve the same SG or SGs). This additional information conveying configuration data related to the sending SGP, can replace the information that, related to such SGP, could have been manually configured in the receiving ASP previously.

The SGP availability information, related to state maintenance and traffic maintenance in such SGP, will be sent, as other state-of-the-art SIGTRAN's defined management and maintenance information, by means of messages sent from the UA layer in the SGP to the corresponding peer UA layer of a connected ASP; wherein, if confirmed flows are implemented, the confirmation messages goes from the UA layer of the receiving ASP to the corresponding peer UA layer of the sending SGP.

According to a second embodiment of the present invention, and based on the aforementioned first embodiment, an ASP will send notifications related to the status concerning to one or more SGs, to the SGP(s) that belongs (that are configured to serve) to such SGs (SG status notifications).

Such SG status information will notify the present availability status of a given SG (or SGs), based on the knowledge in the ASP about the individual status of the SGPs that belong to such SG (or SGs).

Such SG status information can, depending on the notified SG status, and depending on implementation options in the receiving SGP, prompt to the receiving SGP to modify its behaviour for the SG(s) that are indicated in the notification; thus, upon reception of SG status notifications: activating traffic for such SG(s), giving up traffic for such SG(s) or, taking no immediate actions.

BRIEF DESCRIPTION OF THE DRAWINGS

The features, objects and advantages of the invention will become apparent by reading the detailed description in conjunction with the accompanying drawings, in which.

DETAILED DESCRIPTION

Firstly, by using FIGS. 1 to 4 as a reference, it will be described the scenario and network elements involved in the present invention.

Then, by using Figures from 5 to 17, it will be detailed the two embodiments of this invention, as well as the details related to its aspects.

As it has been described previously, and as defined by IETF's SIGTRAN group, two kinds of nodes: Signaling Gateways (SGs) and Application Servers (ASs) have been defined in an architecture to allow SCN signaling transport over a data network; being an AS a virtual element that implements a telecommunication node located in a data network that communicate with one or more telecommunication nodes in the SCN via one or more SG node.

Figure 1:
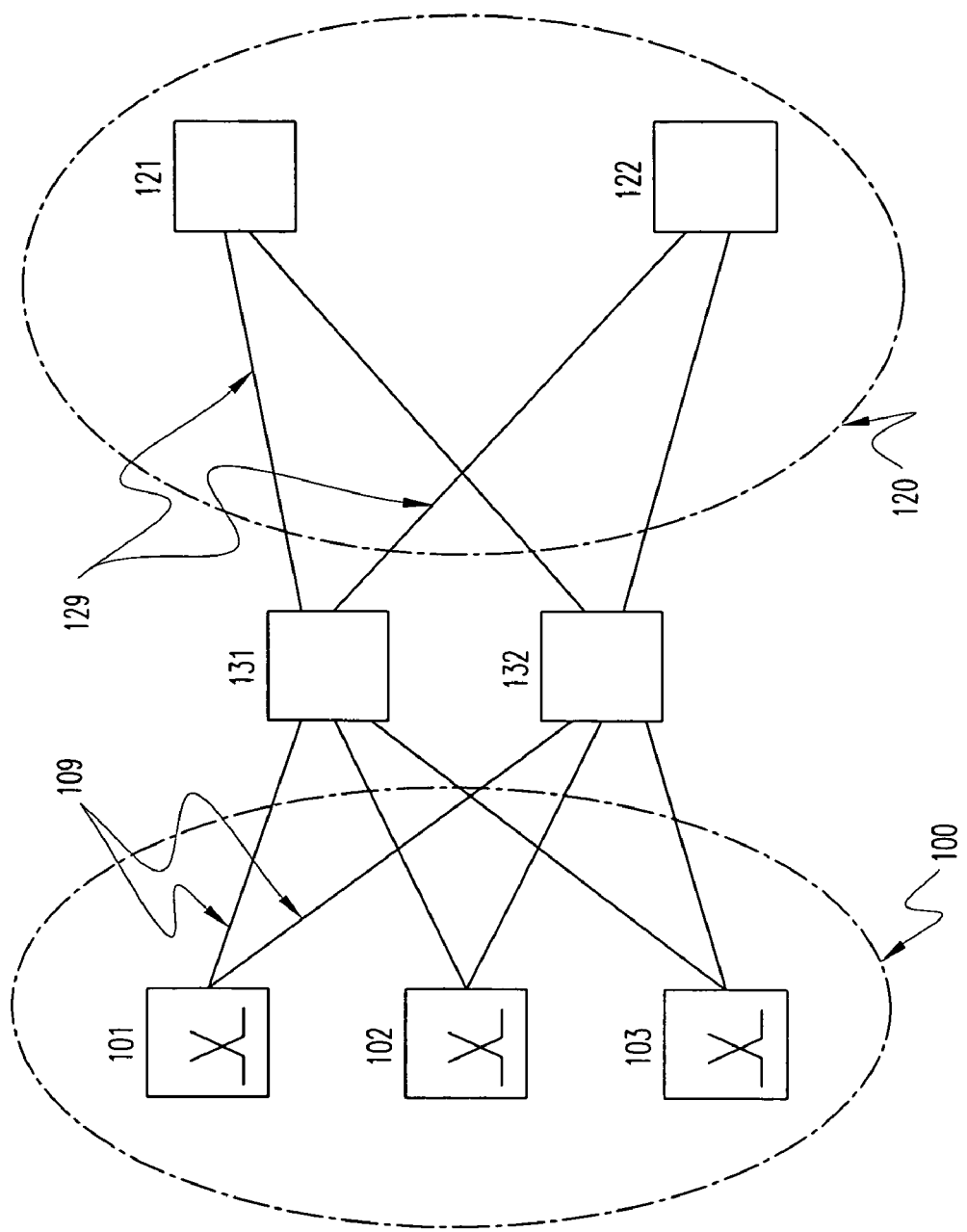
FIG. 1 Shows schematically a physical view of the elements involved in the architecture for transport of SCN signaling between telecommunication nodes in the SCN and telecommunication nodes in a data network, including signaling connections.

FIG. 1 provides a physical view of the interconnection of physical telecommunication nodes (101, 102 and 103) in the SCN (100) and physical entities (AS-hosts) (121 and 122) in the data network (120) that implements AS functions; being such interconnection provided by physical entities (SG-hosts) that implements SG function (131 and 132).

The connection between SG-hosts and telecommunication nodes in the SCN (109) is performed by traditional SCN signaling links, and the connection between SG-hosts and AS-hosts (129) is achieved by means of transport connections using a transport protocol that, in turn, runs over IP protocol. When such transport connections (129) are made using SCTP as transport protocol, they are called in SIGTRAN's terminology "SCTP-associations".

Figure 2:
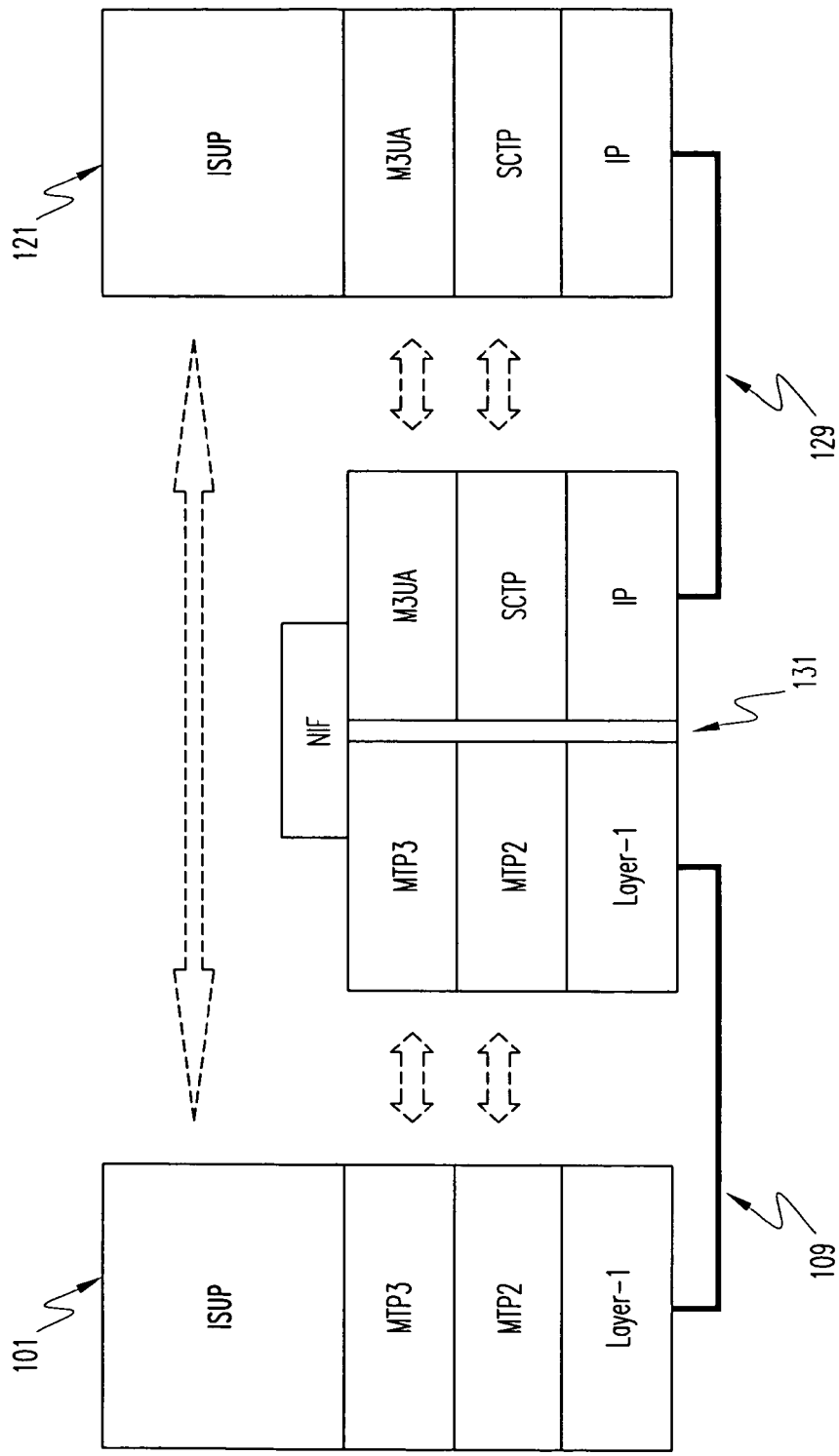
FIG. 2 Shows a logical view of a layered communication, through a signaling gateway, between a telecommunication node located in the SCN network and a telecommunication node located in a data network FIG. 3 Shows the physical nodes involved in transporting SCN signaling over a data network (SG-hosts and AS-hosts) and the signaling connections among the corresponding serving processes (SGPs and ASPs) located in them.

A view of the layered structure of the protocol elements existing in the different nodes shown in FIG. 1, as well as the interworking between such protocol elements is shown in FIG. 2.

In this figure it is shown, as an example, the communication between two SS#7 User Parts, such as ISDN User Part (ISUP), located respectively in one SCN node (101) and in a node in the data network (121), via a SG-host (131):

An ISUP entity in 101 communicates with a peer ISUP entity in 121 in a transparent way by using the services provided by the Layer-3 of Message Transfer part defined for SS#7 (MTP3).

Its peer ISUP entity in 121, communicates with it by using the services provided by the User Adaptation layer defined for adapting MTP3 (M3UA), that offers to ISUP the same communication service primitives as MTP3 does.

The MTP3 peer layers in 101 and 131 communicates by using the services of their respective Layer-2 of Message Transfer parts defined for SS#7 (MTP2), that, in turn, use the Layer-1 for physical communication.

In 131, a Nodal Interworking Function (NIF), provides the mapping between MTP3 messages to the corresponding M3UA messages, and vice-versa.

The M3UA peer layers in 131 and 121 communicates via a data network by using the transmission services provided by a transport protocol that runs over IP (e.g.: SCTP services, by means of SCTP associations).

Figure 3:
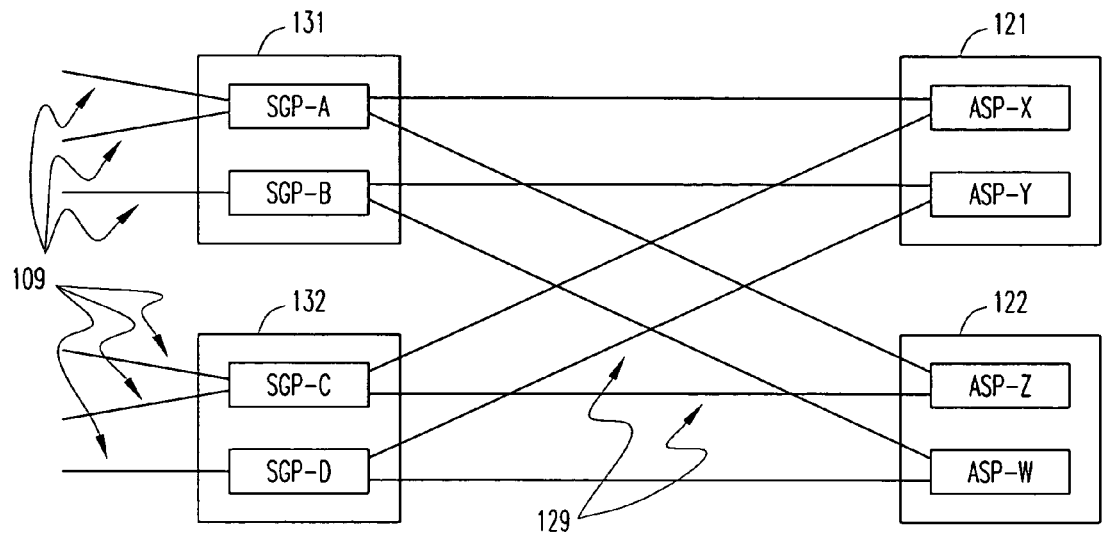
Figure 4:
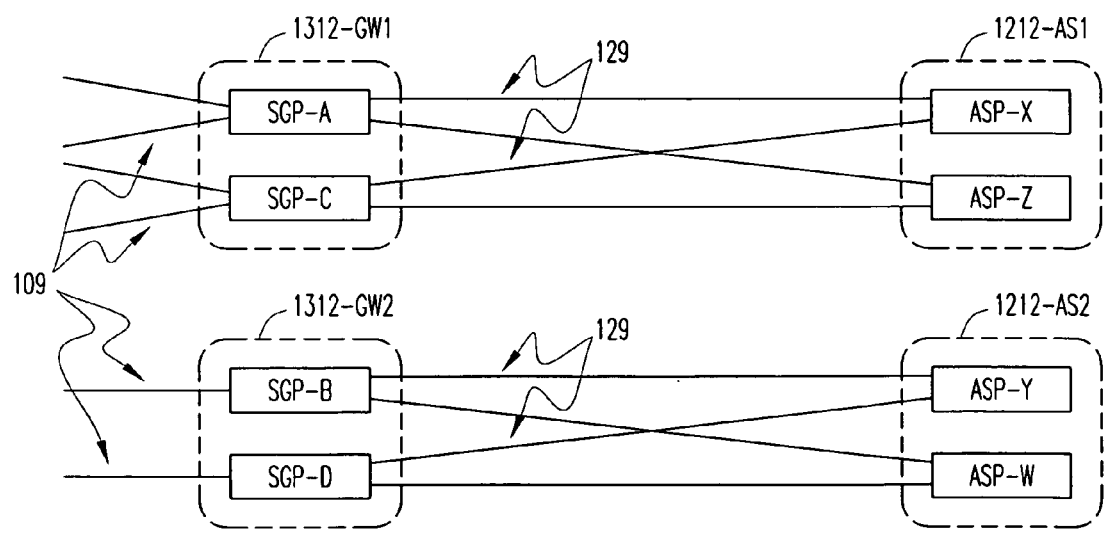
FIG. 4 Shows the logical nodes involved in transporting SCN signaling over a data network (SG-nodes and AS-nodes) and the signaling connections among the corresponding serving processes (SGPs and ASPs) located in them.

The relationship between physical nodes implementing SG functions (SG-hosts 131, 132) and physical nodes implementing AS functions (AS-hosts 121, 122), and the corresponding logical SG-nodes and AS-nodes, as an example of an SGPs/SG configuration and of an ASPs/AS configuration, is shown in FIGS. 3 and 4.

In these figures, as an example, it is assumed that, on each SG-host, there are two specific serving processes (SGPs), and, on each AS-host, there are two specific serving process (ASPs).

At this point, it shall be notice that, using as an example the case wherein ISUP protocol is the SCN protocol be conveyed (as cited previously in FIG. 2), the protocol elements handled by an SGP will be the same as described in FIG. 2 as protocol elements allocated in the SG-host (131) (i.e.: MTP3, MTP2, layer-1, M3UA, SCTP, IP and NIF). In the same way, the protocol elements handled by an ASP will be the same as described in FIG. 2 as protocol elements allocated in the AS-host (121) (i.e.: ISUP, M3UA, SCTP and IP).

FIG. 3 shows two physical SG-hosts (131 and 132):

In SG-host 131 there are two processes performing SG functionality, SGP-A and SGP-B; and in SG-host 132 there are two processes performing SG functionality, SGP-C and SGP-D.

In AS-host 121 there are two processes performing AS functionality, ASP-X and ASP-Y; and in AS-host 122 there are there are two processes performing SG functionality, ASP-Z and ASP-W.

FIG. 4 shows an example wherein SGP-A and SGP-C are logically grouped into one SG-node (1312-GW1), and SGP-B and SGP-D are logically grouped into another SG-node (1312-GW2).

This can be the case where, for instance, processes SGP-A and SGP-C serve connections only to SCN nodes 101 and 102 (for instance, taking only one of them all traffic load, while the other is acting as spare for such traffic; thus, using "override" traffic handling mode); while processes SGP-B and SGP-D serve connections only to SCN node 103 (for instance, sharing traffic load between them; thus, using "load-sharing" traffic handling mode).

This example does not preclude that a certain SGP can belong (can serve, or be configured to serve) to more than one SG-node.

So, now, it can be clearly understood the aforementioned concept of SG (or logical SG-node) for the scope of the present invention as a logical entity: a certain SG is comprised of one or more SGPs that are serving (or can serve) connections to certain destination (or destinations) in the SCN; the SG being mainly characterized by such set of SCN destinations, that are defined by one or more routing parameters, which are addresses and/or routing information commonly used specifically in the SCN, or by the interface identifiers of the (physical or logical) interfaces between the SGP(s) serving such SG and the SCN.

In the same FIG. 4, ASP-X and ASP-Z are logically grouped into one AS-node (1212-AS1), and -Y and ASP-W are logically grouped into one AS-node (1212-AS2).

This can be the case where, for instance, processes ASP-X and ASP-Z serve HLR transactions only for a certain cellular operator (for instance, taking only one of them all traffic load, while the other is acting as spare for such traffic); while processes ASP-Y and ASP-W serve HLR transactions only another cellular operator (for instance, sharing traffic load between them).

This example does not preclude that a certain ASP can belong (can serve, or be configured to serve) to more than one AS-node.

So, now, it can be clearly understood the aforementioned state-of-the-art concept of AS (or logical AS-node) as a logical entity: a certain AS is comprised of one or more ASPs that handle (or can handle) in the IP-network all call processing transactions related to a unique range of SCN destinations that said AS represents in the IP-network; such SCN destinations defined by one or more routing parameters, which are addresses and/or routing information commonly used in the SCN for identifying SCN end-points; or that handle (or can handle) in the IP-network all processing transactions related to one or more interfaces between certain SG(s) and the SCN.

It shall be noticed that, regardless the physical view of the allocation of the SGPs and ASPs, if physical view (FIG. 3) or logical view (FIG. 4), the SCTP-associations are established between SGPs and ASPs, and, more precisely, between certain SGP(s) and certain ASP(s), which are actually, the real end-points of such SCTP-associations.

The invention will now be described following FIG. 5.

Figure 5:
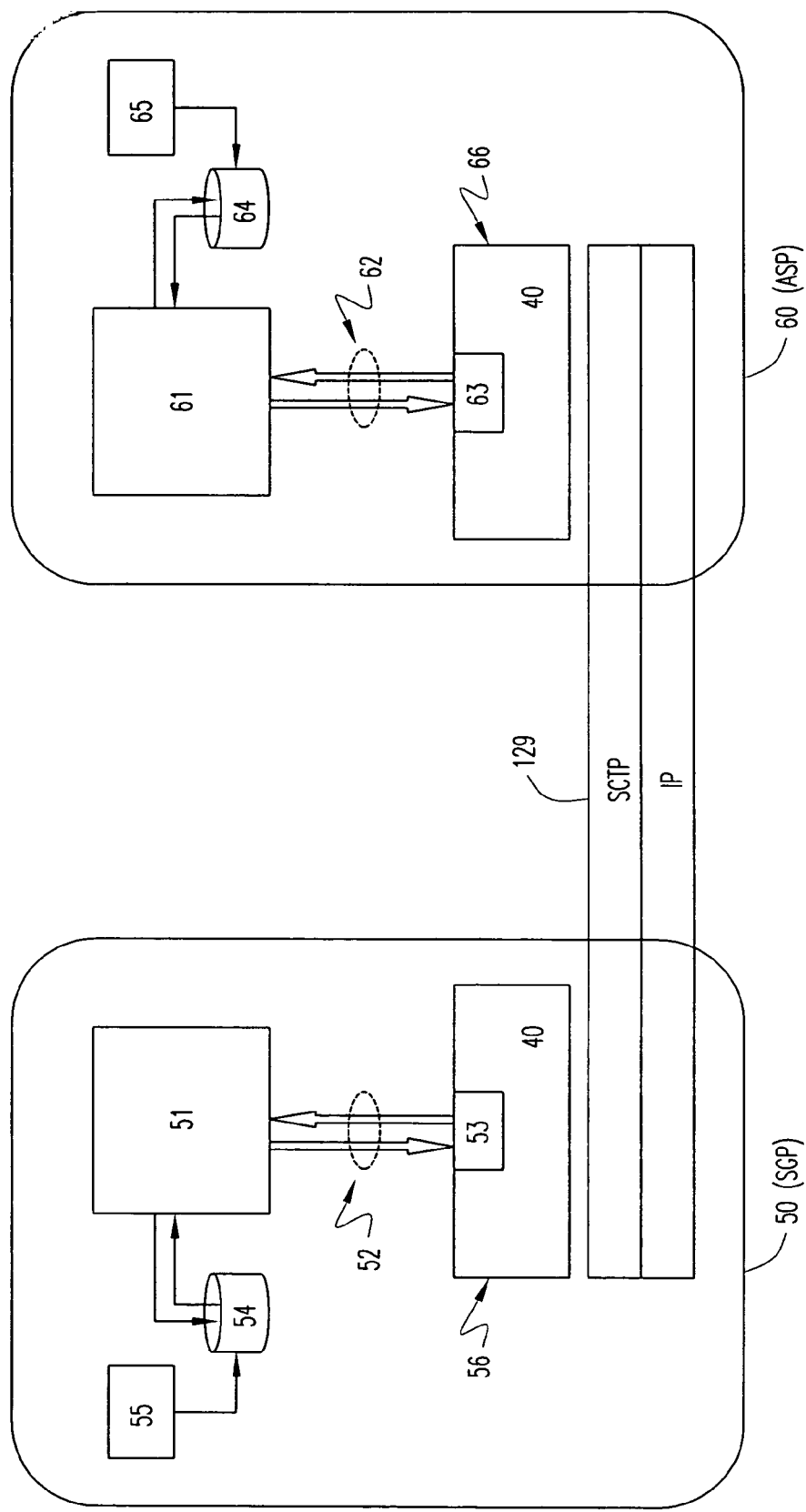
FIG. 5 Shows schematically the elements in a generic SGP and in a generic ASP to perform the methods and functions of this invention.

A generic SGP (50) and a generic ASP (60), communicating among them according to any of the SIGTRAN's defined User Adaptation (UA) (such as M2UA, M3UA, IUA or SUA), and implementing the methods and features of this invention, is shown in FIG. 5. In such figure, the elements to perform such methods and features, as well as their relationship, are indicated.

A detailed description of such elements is then provided.

In an SGP according to this invention (50), the process control means (51) are, according to a first embodiment of this invention, primarily in charge of managing the availability status that affect to such SGP (due to availability circumstances particular to such SGP, or related to the SG-host where such SGP resides), in order to coordinate the sending of such SGP availability information related to such events as state maintenance and/or traffic maintenance events to a connected ASP; and, if confirmed message flows are used for the sending of these events (such as in the present state-or-the-art it is done for ASP state and traffic maintenance), they are also in charge of expecting the corresponding confirmations (acknowledgements), and take the appropriate (implementation dependant) actions if they are not received (such as repeating the sending for a pre-defined number of times).

More specifically, the SGP availability information related to such SGP that will be sent from such SGP to a connected ASP will specify:

for state maintenance: if the SGP is, respectively, in operation but ready only for management and maintenance messages, or if it is out of operation; and for traffic maintenance: if the SGP is, respectively, active for processing signaling traffic messages as well as for processing management and maintenance messages, or not-active for processing signaling traffic messages, but ready only for management and maintenance messages.

The process control means in an SGP (51), can, according to a second embodiment of the present invention, also be in charge of receiving notifications that, related to the SG(s) such SGP is serving, are further received from a connected ASP, and to take further actions based on them that will be later described.

An SGP according to this invention can also be provided with configuration means (55) for setting up configuration data related to such SGP, and related also with the SG(s) served by such SGP; and provided also with the storage means (54) to access such data from the process control means (51) in such SGP when any of such data is intended to be sent to a connected ASP in a SGP state or traffic maintenance event notification.

Such configuration data will establish what SG(s) such SGP is configured to serve (the SGP/SGs configuration), as well as particular data for each one of such SG(s) among the following elements or any combination thereof:

(a) A signaling gateway identifier (SGI) per SG.

(b) A set of routing information elements (RIE) per SG, among:

(b1) Destination Key (DK), each DK containing one or a set of addresses and/or routing information parameters, that are addresses and/or routing information used specifically in the SCN, and that uniquely identifies one or a set of destination's signaling end-points located in the SCN that can be reached through, at least, one SG served by this SGP;

(b2) Destination Context (DC), each DC uniquely identifying, by means of a numerical alias or a text alias, to only one aforementioned DK;

(b3) Interface Identifiers (II), each II uniquely identifying, by means of a numerical alias or a text alias, to a physical interface towards the SCN that can be reached through, at least, one SG served by this SGP;

(c) The default value for one or more Traffic Handling Mode (THMs) information elements; each THM identifying, for each SG this SGP is configured to serve, how traffic shall, primarily, balanced between this SGP and the other SGPs, if any, that serve to such SG; the values of such THM indicating one value type among:

override-ready, expressing that only this SGP among all possible SGP pertaining to certain SG, takes over all traffic belonging to such SG;

load-sharing-ready, expressing that traffic belonging to an SG is distributed between this SGP and all SGPs pertaining to such SG that could be currently active for traffic;

override-stand-by, expressing that only this SGP among all possible SGP pertaining to certain SG, can take over all traffic belonging to such SG, but that traffic is not yet possible to this SGP;

load-sharing-stand-by, expressing that traffic belonging to an SG can distributed between this SGP and all SGPs pertaining to such SG that could be currently active for traffic, but that traffic is not yet possible to this SGP;

Said configuration data may also include one or more ASCII information strings (AISs); each AIS containing text information associated to a specific state management or traffic management event in the SGP.

Although such configuration (55) and storage means (54) are not essential for the fulfilment of the basic embodiments (basic aspects of first and second embodiment) of this invention, they should be needed whenever a non-manually configured data model in the ASPs is implemented; so an ASP can be informed dynamically from an SGP about what SG(s) such SGP belongs to (is configured to serve), as well as the relevant data that characterize to such SG(s); thus, avoiding manual re-configuration of these kind of data in all affected ASPs if certain configuration data in an SGP changes.

In an SGP according to this invention, the protocol control means (52) constitute an interface between the protocol communication means in the UA layer within an SGP (40) and the aforementioned process control means (51). The protocol control means (52) are, according to a first embodiment of this invention, primarily in charge of permitting to the process control means to request to the UA layer in such SGP to send state maintenance and/or traffic maintenance events to a connected ASP; and, if confirmed message flows are used for the sending of these events, they are also in charge of indicating the reception of the corresponding confirmations (acknowledgements) to the process control means (51).

The protocol control means in an SGP (52), can, according to a second embodiment of this invention, also be in charge of indicating to the process control means the reception of notifications that, related to the SG(s) such SGP is serving, are received from a connected ASP.

The interface constituted by the protocol control means (52), between the protocol communication means in the UA layer within an SGP and the process control means, is implemented by means of service primitives between both entities (51 and 40). Therefore, there will be request-primitives, sent from the process control means in an SGP (51) to the protocol control means (40) for requesting the sending of messages; and there will be indication-primitives, sent from the protocol control means (40) to the process control means in an SGP (51) for indicating the reception of messages.

It shall be noticed that the service of the request-primitives will be needed to accomplish the first embodiment of this invention, wherein information related to state maintenance and traffic maintenance in an SGP is sent from such SGP to one or more ASPs; and that the service of the indication-primitives will be needed wherever information from a connected ASP is going to be received according to the present invention; that is to say: if confirmed message flows are used for the sending of information related to state maintenance and traffic maintenance according to the first embodiment of this invention, or for the reception of SG status notification according to the second embodiment of this invention.

The request-primitives in 52 provide a service for requesting the sending of messages, and its corresponding content. They will be characterized by a set of request parameters comprising:

a request header (RH) parameter that identifies requests related to SGP state maintenance or SGP traffic maintenance events;

a request identifier (RI) parameter for classifying the type of notification requested (ToR), the type of request being one ToR among: up-notification-request and down-notification-request, for notifications requests related to state maintenance, expressing that the SGP is, respectively, in operation but ready only for management and maintenance messages, or out of operation; and one ToR among: active-notification-request and inactive-notification-request, for notifications request related to traffic maintenance, expressing that the SGP is, respectively, active for processing signaling traffic messages as well as for management and maintenance messages, or not-active for processing signaling traffic messages but ready only for management and maintenance messages;

and, optionally, a set of one or more additional information (AI) parameters comprising, for each information element that is included in the AI:

a request AI header (RAIH) parameter, that identifies the information element; the RAIH among: DK, DC, II, SGI, THM and AIS; for identifying, respectively, to information elements: Destination Key, Destination Context, Interface Identifier, Signaling Gateway Identifier, Traffic Handling Mode and ASCII information string;

and a request AI content (RAIC) parameter, that conveys the corresponding value of the information element identified by RAIH, and that can take the value stored in the aforementioned storage means (54).

The indication-primitives in 52 provide a service for indicating the reception of messages, and its corresponding content.

The indication-primitives provided by 52 will be characterized by a set of indication parameters comprising:

an indication header (IH) parameter that identifies indications related to SGP state maintenance, SGP traffic maintenance events or SG-notifications;

an indication identifier (II) parameter for classifying the type of notification indicated (ToI), the type of notification indicated being one ToI among: up-notification-acknowledge-indication and down-notification-acknowledge-indication, for acknowledgement notifications indications related to state maintenance;

one ToI among: active-notification-acknowledge-indication and inactive-notification-acknowledge-indication, for acknowledgement notifications indications related to traffic maintenance;

and one ToI being SG-notification-indication, for notification indications related to SG status notifications;

a notified status identifier indication (NSII), for classifying the notified status in SG-notification-indications, the NSII among: SG inactive (SGI), SG active (SGA), insufficient SGP resources active in the SG (ISRAS), and alternate SGP active in the SG (ASA);

and, optionally, if present in the received message, a set of one or more additional information (AI) parameters comprising, for each information element that is included in the AI:

an indication AI header (IAIH) parameter, that identifies the information element; the IAIH among: DK, DC, II, SGI, THM and AIS; for identifying, respectively, to information elements: Destination Key, Destination Context, Interface Identifier, Signaling Gateway Identifier, Traffic Handling Mode and ASCII information string;

an indication AI content (IAIC) parameter, that conveys the corresponding value of the information element identified by IAIC;

The mapping function (53) in an SGP according to the present invention, will, for the first embodiment of this invention, be in charge of coordinating the reception of service request-primitives (52) from the process control means in the SGP (51), with the use of the protocol communication means in the UA layer within the SGP (40) for the sending of the corresponding messages and their contents;

and, more specifically:

associating the value of the received request header (RH) and request identifier (RI) parameters, with, respectively, the content of message class (MC) and message identifier (MI) fields in the message;

and, if present, associating the value of every received pair: request additional information header/request additional information content parameters (RAIH/RAIC), parameter, with, respectively, the content of every pair fields: additional parameter identifier/additional parameter content (API/APC) in the message;

and, if confirmed message flows are used for the sending of information related to state maintenance and traffic maintenance according to the first embodiment of this invention, or, according to the second embodiment of this invention, for the reception of SG status notification; such mapping function (53) will also be in charge of coordinating the reception of messages in the UA layer within the SGP (40), with the use of service indication-primitives (52) for indicating to the process control means in the SGP (51) the reception of such messages and their corresponding content; and, more specifically:

associating the content of message content (MC) and message identifier (MI) fields in the message, with, respectively, the value of indication header (IH) and indication identifier (II) indication parameters to be indicated;

associating, if present, the value of every received pair additional parameter identifier/additional parameter content (API/APC) fields in the message, with, respectively, the content of every pair indication additional information header/indication additional information content (IAIH/IAIC) parameters to be indicated;

and associating, for SG status notifications, the content of the notified status content (NSC) field in the message, with the notified status identifier indication (NSII) parameter to be indicated.

An SGP and an ASP according to this invention shall be provided with protocol communication means (40).

For the first embodiment of this invention, the protocol communication means (40) will comprise a set of messages that will convey SGP state maintenance and SGP traffic maintenance events that, related to an SGP, are sent from such SGP to an ASP; and, if confirmed message flows are used for the sending of this information, such means will also comprise a set of messages, sent from an ASP to an SGP, that will convey confirmations (acknowledgements) of the reception of the state maintenance and traffic maintenance messages in such ASP.

For the second embodiment of this invention, the protocol communication means (40) will comprise one message that will convey status of one or more SGs and that will be sent from an ASP to an SGP that belongs (that is configured to serve) to such SGs.

For both embodiments of this invention, the protocol communication means in an SGP (40) and the protocol communication means in an ASP (40), will be owned, respectively, by the UA layer within such SGP (56) and by the UA layer within such ASP (66); so, such protocol communication means (40) will be added, as a complement, to the state-of-the-art protocol communication means in UA layers for management and maintenance messages, that are constituted by a set of management messages (MGMT), ASP state maintenance messages (ASPSM) and ASP traffic maintenance messages (ASPTM).

Therefore, in the same way as other management (MGMT) or maintenance messages (ASPSM or ASPTM), all messages described in this invention will be exchanged between an SGP and an ASP by using the communication services provided by the transport layer (and transport protocol) in such SGP and ASP; being, for this purpose, a transport layer connection (e.g.: an SCTP association) (129) established between the UA layer within an ASP and the corresponding peer UA layer within an SGP by other state-of-the-art management procedures that, as it will be described later, takes place prior to the procedures described in this invention.

The messages conveyed (sent and received) by the protocol communication means (40) will be characterized by a set of fields that will distinguish them from the already existing management and maintenance messages defined by SIGTRAN for the different UA layers. Such fields are:

A message class (MC) field will identify the message as related to: SGP state maintenance, SGP traffic maintenance, and SG status notification.

A message identifier (MI) field will identify, per MC, the message type for each message; wherein the MIs per MC defined for this invention are:

for MC "SGP state maintenance": up-notification (SGPUP) and down-notification (SGPDOWN), expressing, respectively, that the SGP is in operation but ready only for management and maintenance messages, or out of operation; wherein corresponding acknowledge messages SGPUP-ACK and SGPDOWN-ACK are also defined for allowing confirmed message flows for SGP state maintenance;

for MC "SGP state maintenance": active-notification (SGPAC) and inactive-notification (SGPIA), expressing, respectively, that the SGP is active for processing signaling traffic messages as well as for management and maintenance messages, or not-active for processing signaling traffic messages but ready only for management and maintenance messages; wherein corresponding acknowledge messages SGPAC-ACK and SGPIA-ACK are also defined for allowing confirmed message flows for SGP traffic maintenance;

for MC "SG status notification": notification (NOTIFY).

The messages conveyed by the protocol communication means (40) cited above, will, depending on the message type, convey also a set of information parameter fields that will contain an extra information for each message.

According to the scope of this invention, the information parameter fields can convey: additional parameters, to carry optional additional information (AI) suitable for any message type; and notified status parameter, to carry mandatory notified status information for message type NOTIFY.

Regarding additional information (AI), each additional information parameter will be composed of an additional parameter identifier (API), and an additional parameter content (APC) that will convey the value of the information element identified by the API.

The APIs supported by the protocol communication means (40) are:

DK, DC, II, SGI, THM and AIS; for identifying, respectively, to information elements: Destination Key, Destination Context, Interface Identifier, Signaling Gateway Identifier, Traffic Handling Mode and ASCII information string;

Regarding status information (suitable only for message type NOTIFY), this parameter, since it will be mandatory in NOTIFY message, will be identified by a notified status content (NSC); being the NSC one among: SGI, expressing SG inactive; SGA, expressing SG active; ISRAS, expressing insufficient resources active in the SG; and ASA, expressing alternate SGP active in the SG In an ASP according to this invention (60), the process control means (61) are, according to a first embodiment of this invention, primarily in charge of managing the availability events (state maintenance and/or traffic maintenance events) that, affecting a certain SGP, are received in such ASP from such SGP, and to take further actions based on them that will be later described; and if confirmed message flows are used for the sending of such events (such as in the present state-or-the-art it is done for ASP state and traffic maintenance), they are also in charge of sending the corresponding confirmations (acknowledgements) back to the sending SGP.

The process control means in an ASP (61), can, according to a second embodiment of the present invention, also be in charge of sending notifications related to the status of certain SG (or SGs), to the SGP (or SGPs) that are configured to serve such SG(s); wherein the knowledge for sending such SG status notifications is achieved by accessing from 61 the content of the information stored for the concerned SG(s)

and SGP(s) in the storage means within such ASP (64) More specifically, the SG status notifications sent from an ASP to an SGP will notify one status content among:

if there is not any SGP active currently serving a certain SG;

if there is, at least, one SGP active currently serving a certain SG;

if there is(are) not sufficient SGP(s) active currently serving a certain SG;

if an alternate SGP became active for serving a certain SG;

An ASP according to this invention will also be provided with storage means (64). Such storage means will store, for each SGP and for each SG, and according to the first embodiment of this invention, their individual SGP status and SG status, as well as additional information related to such SGPs and SGs.

More specifically, and regarding data related to SGPs, the storage means (64) will store per SGP:

The particular SGP status, such status among:

SGP_INACTIVE, for an SGP that sent an up-notification (SGPUP), or for an SGP that sent an inactive-notification (SGPIA);

SGP_DOWN, for an SGP that sent a down-notification (SGPDOWN);and

SGP_ACTIVE, for an SGP that sent an active-notification (SGPAC); being the SGP_DOWN status the initial status set in such storage means for an SGP that has not yet sent to such ASP any state maintenance or traffic maintenance event; and, optionally:

One signaling gateway identifier (SGI) per SG that is served by such SGP;

At least one routing information element (RIE) per SG that is served by such SGP, the RIE among: Destination Key (DK), Destination Context (DC), Interface Identifier (II), or any combination thereof;

One traffic handling mode (THM) per SG that is served by such SGP;

The status of the SGP split per SG served by such SGP;

A link pointing to the SG(s) served by such SGP;

or any combination thereof; wherein, the SG(s) served by a particular SGP is(are) determined either:

by manually pre-configured stored data that establishes what SG(s) such SGP belongs to; or by one SGI per SG, or one RIE per SG, or one SGI and one RIE per SG; being such data among the ones received in the ASP in traffic and/or state maintenance from such SGP.

Regarding now more specifically data related to SGs, the storage means (64) will store per SG:

The particular SG status, such status among:

SG_DOWN, if all SGP(s) pertaining to such SG are in status SGP_DOWN;

SG_INACTIVE, if no SGP pertaining to such SG is in status SGP_ACTIVE and, at least, one of such SGP(s) is in status SGP_INACTIVE;

SG_ACTIVE, if, at least, one of the SGP(s) pertaining to such SG is in status SGP_ACTIVE;

being the SG_DOWN status the initial status set in such storage means for an SG when no one of the SGP(s) pertaining to such SG has sent yet to such ASP any state maintenance or traffic maintenance event;

and, optionally:

one SGI;

one RIE among: DK, DC, II, or any combination thereof;

one THM;

A link pointing to the SGP(s) that serve such SGP;

or any combination thereof; wherein each SG can be identified by one SGI, or by one RIE, or by one SGI and one RIE;

and wherein, if a certain SGP belongs to a certain SG (or SGs), is determined either:

by manually pre-configured stored data that establishes what SG(s) such SGP belongs to; or it is indicated by the content of, at least , one stored element among: one SGI or one RIE received in state maintenance and/or traffic maintenance events from an SGP;

At this point it shall be noticed that, in an ASP, the aforementioned information to be stored related to SGP(s) and SG(s) within the storage means (64), is the base in such ASP for routing traffic related to a certain SG (defined by routing parameters used in the traffic messages, such as DK or DC) to the appropriate SGP that can serve such SG, and also for selecting the appropriate alternative SGP to be used in case of unavailability of other SGP within the same SG.

Also, an ASP according to this invention, can be also provided with configuration means (65) to fulfil with the second embodiment of this invention.

Such configuration means (65) in an ASP will set up, in a per SG basis, configuration data about the minimum number of active SGP(s) (SGPs in status "SGP_ACTIVE") required for each SG in particular; being such data stored in the aforementioned storage means (64) in the ASP for each SG as one more data among the aforementioned optional data related to SGs.

In an ASP according to this invention, the protocol control means (62) constitute an interface between the protocol communication means in the UA layer within an ASP (40) and the aforementioned process control means (61). The protocol control means (62) are, according to a first embodiment of this invention, primarily in charge of indicating to the process control means (61) the reception of state maintenance and/or traffic maintenance events from a connected SGP; and, if confirmed message flows are used for the sending of these events, they are also in charge of permitting to the process control means (61) to request to the UA layer in such ASP to send the corresponding confirmations (acknowledgements) to such state maintenance and/or traffic maintenance events.

The protocol control means in an ASP (62), can, according to a second embodiment of this invention, also be in charge of permitting to the process control means to request to the UA layer in such ASP to send SG status notifications to a connected SGP that is configured to serve such SG.

The interface constituted by the protocol control means (62), between the protocol communication means in the UA layer within an ASP and the process control means, is implemented by means of service primitives between both entities (61 and 40). Therefore, there will be request-primitives, sent from the process control means in an ASP (61) to the protocol control means (40) for requesting the sending of messages; and there will be indication-primitives, sent from the protocol control means (40) to the process control means in an ASP (61) for indicating the reception of messages.

It shall be noticed that the service of the indication-primitives will be needed to accomplish the first embodiment of this invention, wherein an ASP receives information related to state maintenance and traffic maintenance related to a connected SGP from such SGP; and that the service of the request-primitives will be needed wherever information to a connected SGP is going to be sent from the ASP according to the present invention; that is to say: if confirmed message flows are used for the sending of information related to state maintenance and traffic maintenance according to the first embodiment of this invention, or for the sending of SG status notification from the ASP to an SGP according to the second embodiment of this invention.

The indication-primitives in 62 provide a service for indicating the reception of messages, and its corresponding content.

The indication-primitives provided by 62 will be characterized by a set of indication parameters comprising:

an indication header (IH) parameter that identifies indications related to SGP state maintenance or SGP traffic maintenance event notifications;

an indication identifier (II) parameter for classifying the type of notification indicated (ToI), the type of notification indicated being one ToI among: up-notification-indication and down-notification-indication, for notifications indications related to state maintenance;

and one ToI among: active-notification-indication and inactive-notification-indication, for notifications indications related to traffic maintenance;

and, optionally, if present in the received message, a set of one or more additional information (AI) parameters comprising, for each information element that is included in the AI:

an indication AI header (IAIH) parameter, that identifies the information element; the IAIH among: DK, DC, II, SGI, THM and AIS; for identifying, respectively, to information elements: Destination Key, Destination Context, Interface Identifier, Signaling Gateway Identifier, Traffic Handling Mode and ASCII information string;

an indication AI content (IAIC) parameter, that conveys the corresponding value of the information element identified by IAIC.

The request-primitives in 62 provide a service for requesting the sending of messages, and its corresponding content. They will be characterized by a set of request parameters comprising:

a request header (RH) parameter that identifies requests related to SGP state maintenance events, SGP traffic maintenance events or SG-notifications;

a request identifier (RI) parameter for classifying the type of notification requested (ToR), the type of request being one ToR among: up-notification- acknowledge-request and down-notification- acknowledge-request, for acknowledgement notification requests related to state maintenance;

one ToR among: active-notification- acknowledge-request and inactive-notification- acknowledge-request, for acknowledgement notification requests related to traffic maintenance;

a notified status identifier request (NSIR), for classifying the notified status in SG-notification requests, the NSIR among: SG inactive (SGI), SG active (SGA), insufficient SGP resources active in the SG (ISRAS), and alternate SGP active in the SG (ASA);

and, optionally, a set of one or more additional information (AI) parameters comprising, for each information element that is included in the AI:

a request AI header (RAIH) parameter, that identifies the information element; the RAIH among: DK, DC, II, SGI, THM and AIS; for identifying, respectively, to information elements: Destination Key, Destination Context, Interface Identifier, Signaling Gateway Identifier, Traffic Handling Mode and ASCII information string; and a request AI content (RAIC) parameter, that conveys the corresponding value of the information element identified by RAIH.

The mapping function (63) in an ASP according to the present invention, will, for the first embodiment of this invention, be in charge of coordinating the reception of messages in the UA layer within the ASP (40), with the use of service indication-primitives (62) for indicating to the process control means in the ASP (61) the reception of such messages and their corresponding content;

and, more specifically:

associating the content of MC and MI fields in the message, with, respectively, the value of indication header (IH) and indication identifier (II) indication parameters to be indicated;

and, if present, associating the value of every received pair fields additional parameter identifier/additional parameter content (API/APC) in the message, with, respectively, the content of every pair indication additional information header/indication additional information content parameters (IAIH/IAIC) to be indicated;

and, if confirmed message flows are used for the sending of information related to state maintenance and traffic maintenance according to the first embodiment of this invention, or, according to the second embodiment of this invention, for the sending of SG status notification; such mapping function (63) will also be in charge of coordinating the reception of service request-primitives (62) from the process control means in the ASP (61), with the use of the protocol communication means in the UA layer within the ASP (40) for the sending of the corresponding messages and their contents;

and, more specifically:

associating the value of the received request header (RH) and request identifier (RI) parameters, with, respectively, the content of message class (MC) and message identifier (MI) fields in the message;

associating, if present, the value of every received pair: request additional information header/request additional information content parameters (RAIH/RAIC), parameter, with, respectively, the content of every pair fields: additional parameter identifier/additional parameter content (API/APC) in the message;

and associating, for SG status notifications, the content of the value of the received notified status identifier request (NSIR) parameter, with the content of the notified status content (NSC) field in the message.

Now, the first embodiment of this invention, wherein an SGP sends to one or more connected ASPs information related to state maintenance and traffic maintenance availability events in such SGP, will be detailed with reference to FIGS. 6 to 12.

The basic operation of the first embodiment of this invention, wherein only one ASP and one SGP are considered (such as ASP-X and SGP-A referred in previous FIG. 3 or 4); shall hereinafter be detailed with reference to FIG. 6.

According to SIGTRAN definitions for the different User Adaptation (UA) layer protocols (M2UA, M3UA, IUA and SUA), a transport connection (SCTP-association) shall be established between an ASP and an SGP prior to the exchange of any state or traffic maintenance message;

therefore, and according to the UA's state-of-the-art procedures for management procedures, ASP-X establishes an SCTP-association with SGP-A, and, upon confirmation that such association is established, ASP-X sends an ASP state maintenance message ASPUP to the connected SGP-A to indicate that it is ready to exchange management and maintenance messages with such SGP.

Also, according to the UA's state-of-the-art procedures for management procedures, SGP-A, acknowledges the reception of the ASPUP message by sending back an ASPUP-ACK message to ASP-X.

Then, and according to the first embodiment of this invention, upon reception of ASPUP and further sending of ASPUP-ACK, SGP-A will send to the connected ASP-X an SGP state maintenance message SGPUP that indicates, explicitly, that SGP-A is also ready for exchanging management and maintenance messages.

The SGPUP message can contain a set of additional information indicating the SG(s) such SGP-A is configured to serve, as well as the traffic handling mode (THM) that, for every indicated SG, and with independent values for each one of them, will be used in such SGP-A in particular for handling the traffic related to such SG(s) between it and other possible SGP(s) serving to such SG(s): if in "override" mode (thus this SGP-A takes all traffic related to a certain SG), or in "load-sharing" mode (thus this SGP-A will share with other SGPs the traffic for this SG).

The SG(s) such SGP-A is configured to serve are explicitly indicated and/or characterized by the inclusion in the message of, at least, one of the following elements per SG, or any combination thereof:

a Signaling Gateway Identifier (SGI), that identifies, by means of a numerical or text alias, to a certain SG;

a routing information element (RIE) among:

a Destination Key (DK), containing one or a set of addresses and/or routing information parameters, that are addresses and/or routing information used specifically in the SCN, that uniquely identifies one or a set of destination's signaling end-points located in the SCN that can be reached through this SGP;

a Destination Context (DC), such DC uniquely identifying, by means of a numerical alias or a text alias, to only one aforementioned DK.

one or more Interface Identifiers (IIs) information elements; each II uniquely identifying, by means of a numerical alias or a text alias, to a physical interface towards the SCN that can be reached through this SGP;

that, together with the THM element(s) are taken from the storage means in the SGP (54) before sending the message.

The additional information in the SGPUP message can convey also an ASCII information string (AIS) containing miscellaneous text information associated to this message.

When ASP-X receives the SGPUP message, it updates in the storage means (64) the current status of SGP-A from "SGP_DOWN" to "SGP_INACTIVE", and also update, if proceeds, the current status of the SG(s) such SGP-A is configured to serve to the appropriate resulting SG status (as will be later detailed).

If no additional information is received in the SGPUP message related to the SG(s) such SGP-A is configured to serve, then the present state-of-the-art techniques for a manual configuration model for ASP will be used to determine such SG(s), wherein the default value is all the SGs that, according to manually configured data in ASP-X, are to be served by SGP-A.

Otherwise, if additional information is received in the SGPUP message related to the SG(s) such SGP-A is configured to serve, then ASP-X will store in the storage means (64) such information for the SG(s) indicated in the SGPUP; and, more precisely:

update the current status of SGP-A to "SGP_INACTIVE" only for the SG(s) indicated in the SGPUP;

update, if proceeds, the current status only of the SG(s) indicated in the SGPUP to the appropriate resulting SG status (as will be later detailed);

update, if received, the THM(s) indicated for each SG(s) indicated in the SGPUP;

update the SG(s) this SGP-A belongs to based on the SG(s) indicated in the SGPUP, as well as the routing information elements (RIE) and/or SG identifier (SGI) that define each SG received in that message.

Then, assuming a realization wherein confirmed message flows are used for SGP state and traffic maintenance, ASP-X will send a confirmation message SGPUP-ACK back to SGP-A.

If additional information was received in the SGPUP message, then the SGPUP-ACK message can contain the additional information that has been accepted in ASP-X to confirm to SGP-A that it has been accepted.

According to the UA's state-of-the-art procedures for management procedures, once an ASP has exchanged ASPUP/ASPUP-ACK with an SGP, if it wants to indicate that it is active and ready to process signaling traffic for a particular AS (or ASs), it sends an ASP traffic maintenance message ASPAC to such SGP. So, in the case described, ASP-X sends a traffic maintenance message ASPAC to the connected SGP-A to indicate that it is ready to exchange traffic related messages with such SGP.

Also, according to the UA's state-of-the-art procedures for management procedures, SGP-A, acknowledges the reception of the ASPAC message by sending back an ASPAC-ACK message to ASP-X.

Then, and according to the first embodiment of this invention, upon reception of ASPAC and further sending of ASPAC-ACK, SGP-A will send to the connected ASP-X an SGP traffic maintenance message SGPAC that indicates, explicitly, that SGP-A is also ready for traffic related messages with ASP-X.

The SGPAC message can contain a set of additional information indicating, which SG(s), among the SG(s) such SGP-A is configured to serve, become actively served for traffic related messages from this SGP, as well as the traffic handling mode (THM) that, for every indicated SG, and with independent values for each one of them, is going to be used in such SGP-A in particular for handling the traffic related to such SG(s) between it and other possible SGP(s) serving to such SG(s): if in "override" mode (thus this SGP-A takes all traffic related to a certain SG), or in "load-sharing" mode (thus this SGP-A will share with other SGPs the traffic for this SG).

The SG(s) such SGP-A is configured to serve are explicitly indicated and/or characterized by the inclusion in the message of the same kind of information aforementioned for SGPUP message (SGI, RIE and THM).

The additional information in the SGPAC message can convey also an ASCII information string (AIS) containing miscellaneous text information associated to this message.

When ASP-X receives the SGPAC message, it updates in the storage means (64) the current status of SGP-A from "SGP_INACTIVE" to "SGP_ACTIVE", and also update, if proceeds, the current status of the SG(s) such SGP-A is configured to serve to the appropriate resulting SG status (as will be later detailed).

If no additional information is received in the SGPAC message related to the SG(s) such SGP-A wants to actively serve for traffic related messages, then either:

if no information related to the SG(s) served by SGP-A was received in the previous SGPUP from SGP-A, then the present state-of-the-art techniques for a manual configuration model for ASP will be used to determine such SG(s), wherein the default value is all the SGs that, according to manually configured data in ASP-X, are to be served by SGP-A;

or, if information related to the SG(s) served by SGP-A was received in the previous SGPUP from SGP-A, then such SGs shall be considered.

Otherwise, if additional information is received in the SGPAC message related to the SG(s) such SGP-A wants to actively serve for traffic related messages, then ASP-X will store in the storage means (64) such information for the SG(s) indicated in the SGPAC; and, more precisely:

update the current status of SGP-A to "SGP_ACTIVE" only for the SG(s) indicated in the SGPAC;

update, if proceeds, the current status only of the SG(s) indicated in the SGPAC to the appropriate resulting SG status (as will be later detailed);

update, if received, the THM(s) indicated for each SG(s) indicated in the SGPAC;

update the SG(s) this SGP-A belongs to based on the SG(s) indicated in the SGPAC that were not received in previous SGPUP, or that were received but that are received again in the SGPAC, as well as the routing information elements (RIE) and/or SG identifier (SGI) that define each SG received in the SGPAC message.

Regarding more precisely the THM parameter, if such parameter is received related to one or more SG(s), then ASP-X:

use exclusively SGP-A for further signaling traffic messages related to those SG(s) that are indicated with a THM "override-ready";

share further signaling traffic messages related to certain SG(s) among SGP-A and other SGP(s) currently active for traffic for such SG(s), for those SG(s) that are indicated with a THM "load-sharing-ready";

or do not yet send nor expect signaling traffic messages to/from SGP-A for those SG(s) that are indicated with a THM "override-stand-by" or "load-sharing-stand-by".

Then, assuming a realization wherein confirmed message flows are used for SGP state and traffic maintenance, ASP-X will send a confirmation message SGPAC-ACK back to SGP-A.

If additional information was received in the SGPAC message, then the SGPAC-ACK message can contain the additional information that has been accepted in ASP-X to confirm to SGP-A that it has been accepted.

According to the UA's state-of-the-art procedures for management procedures, when, due to any reason, an ASP wishes to withdraw from receiving traffic within an AS or all AS(s) it is currently serving, then such ASP sends an ASPIA message to the connected SGP(s) that it previously had sent an ASPAC message.

Additionally, if the ASP wishes to be removed from any service from any or all AS it is serving, it sends an ASP-DOWN message to all connected SGP(s) to indicate that it is not ready for processing (sending and/or receiving) any traffic related message nor for management or maintenance messages.

Both messages: ASPIA and ASPDOWN are, in the present state-of-the-art, acknowledged from the receiving SGP(s) by respective acknowledgement messages ASPIA-ACK and ASPDOWN-ACK.

Figure 6:
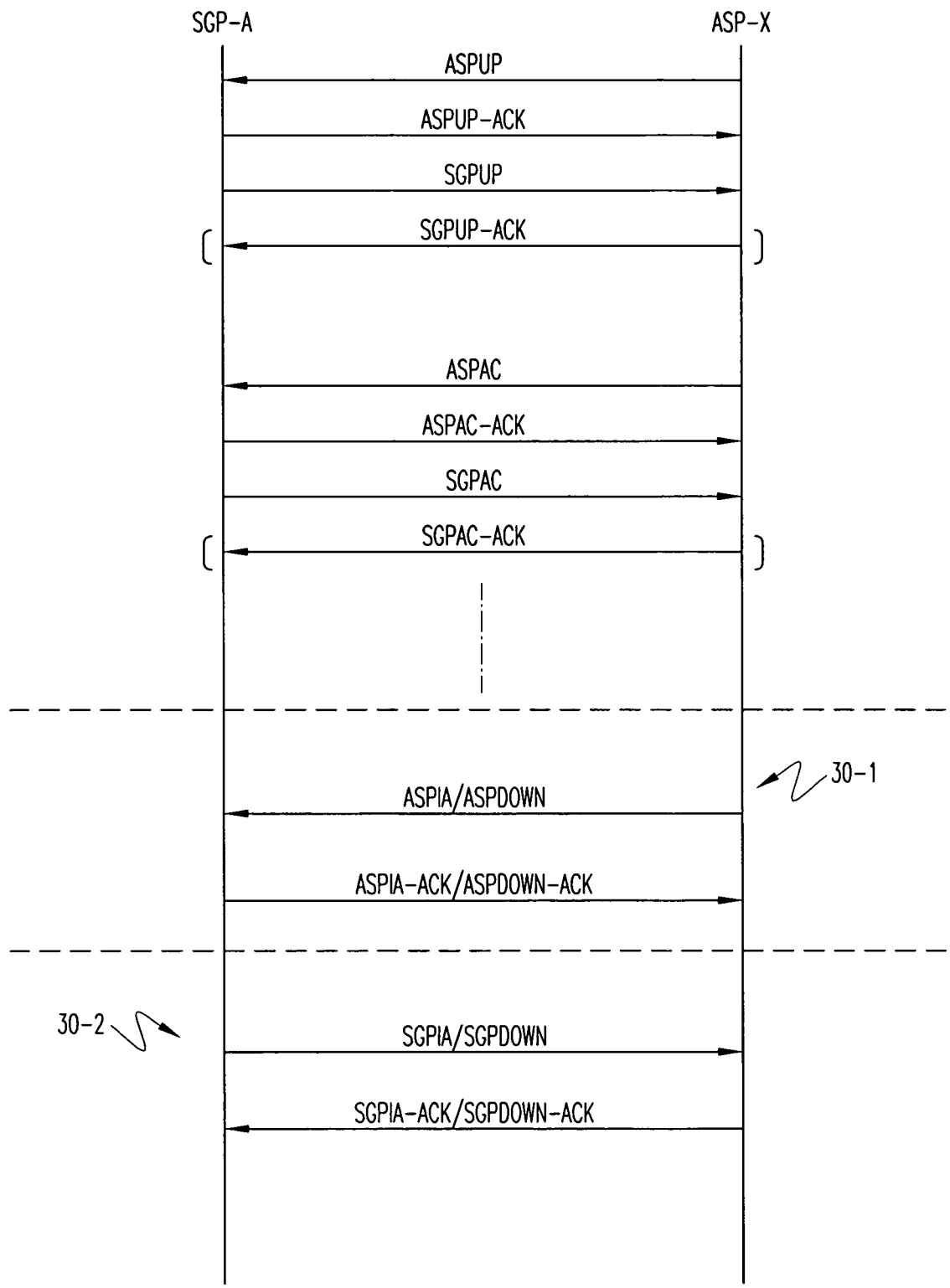
FIGS. 6, 7, 8 and 9 Show different interworking flows for the first embodiment of this invention, wherein availability and unavailability indications are received in an ASP from a connected SGP.

These state-of-the-art message flows are shown in FIG. 6, wherein the event that trigger the ASPIA or ASPDOWN message is represented by 30-1.

According to the first embodiment of the present invention, an availability event that affects to an SGP (such as 30-2 to SGP-A in the example) will be indicated also to the corresponding affected ASP's.

In particular, if SGP-A wants to withdraw from sending and receiving traffic related messages, it will send an SGP traffic maintenance message SGPIA to all ASP(s) it had previously sent an SGPAC message. In the example of FIG. 6, it will send the SGPIA message to ASP-X.

Similarly, if SGP-A wants to indicate it is no longer ready for processing (sending and/or receiving) any traffic related message nor for management or maintenance messages, it will send an SGP state maintenance message SGPDOWN to all ASP(s) it is connected. In the example of FIG. 6, it will send the SGPDOWN message to ASP-X.

These new flows are shown in FIG. 6, wherein the event that trigger the SGPIA or SGPDOWN message is represented by 30-2.

The SGPIA and SGPDOWN messages can contain a set of additional information indicating, which SG(s), among the SG(s) such SGP-A is serving, become, respectively, inactive for traffic (only for management and maintenance messages), or not ready for traffic nor for management or maintenance messages from this SGP.

The SG(s) affected by an SGPIA or SGPDOWN message are explicitly indicated and/or characterized by the inclusion in the message of the same kind of information aforementioned for SGPUP message (SGI, RIE), being in this case the THM parameter not needed.

The additional information in SGPIA and SGPDOWN messages can convey also an ASCII information string (AIS) containing miscellaneous text information associated respectively to these messages.

When ASP-X receives an SGPIA message, it updates in the storage means (64) the current status of SGP-A to "SGP_INACTIVE"; and, when it receives an SGPDOWN message, it updates the current status of SGP-A to "SGP_DOWN".

If proceeds, ASP-X updates also the current status of the SG(s) such SGP-A is configured to serve to the appropriate resulting SG status (as will be later detailed).

If no additional information is received in an SGPIA or SGPDOWN message related to the SG(s) such SGP-A wants, respectively, to withdraw for traffic related messages or also for management and maintenance messages, then either:

if no information related to the SG(s) served by SGP-A was received in a previous SGPUP or SGPAC from SGP-A, then the present state-of-the-art techniques for a manual configuration model for ASP will be used to determine such SG(s), wherein the default value is all the SGs that, according to manually configured data in ASP-X, are to be served by SGP-A;

or, if information related to the SG(s) served by SGP-A was received in a previous SGPUP or SGPAC from SGP-A, then such SGs shall be considered.

Otherwise, if additional information is received in the an SGPIA or SGPDOWN message related to the SG(s) such SGP-A wants, respectively, to withdraw for traffic related messages or also for management and maintenance messages, then ASP-X will store in the storage means (64) such information for the SG(s) indicated, respectively, in the SGPIA or SGPDOWN message; and, more precisely:

when SGPIA message is received, update the current status of SGP-A to "SGP_INACTIVE" only for the SG(s) indicated in the SGPIA;

when SGPDOWN message is received, update the current status of SGP-A to "SGP_DOWN" only for the SG(s) indicated in the SGPDOWN;

update, if proceeds, the current status only of the SG(s) indicated in the SGPIA or SGPDOWN to the appropriate resulting SG status (as will be later detailed).

Figure 12:
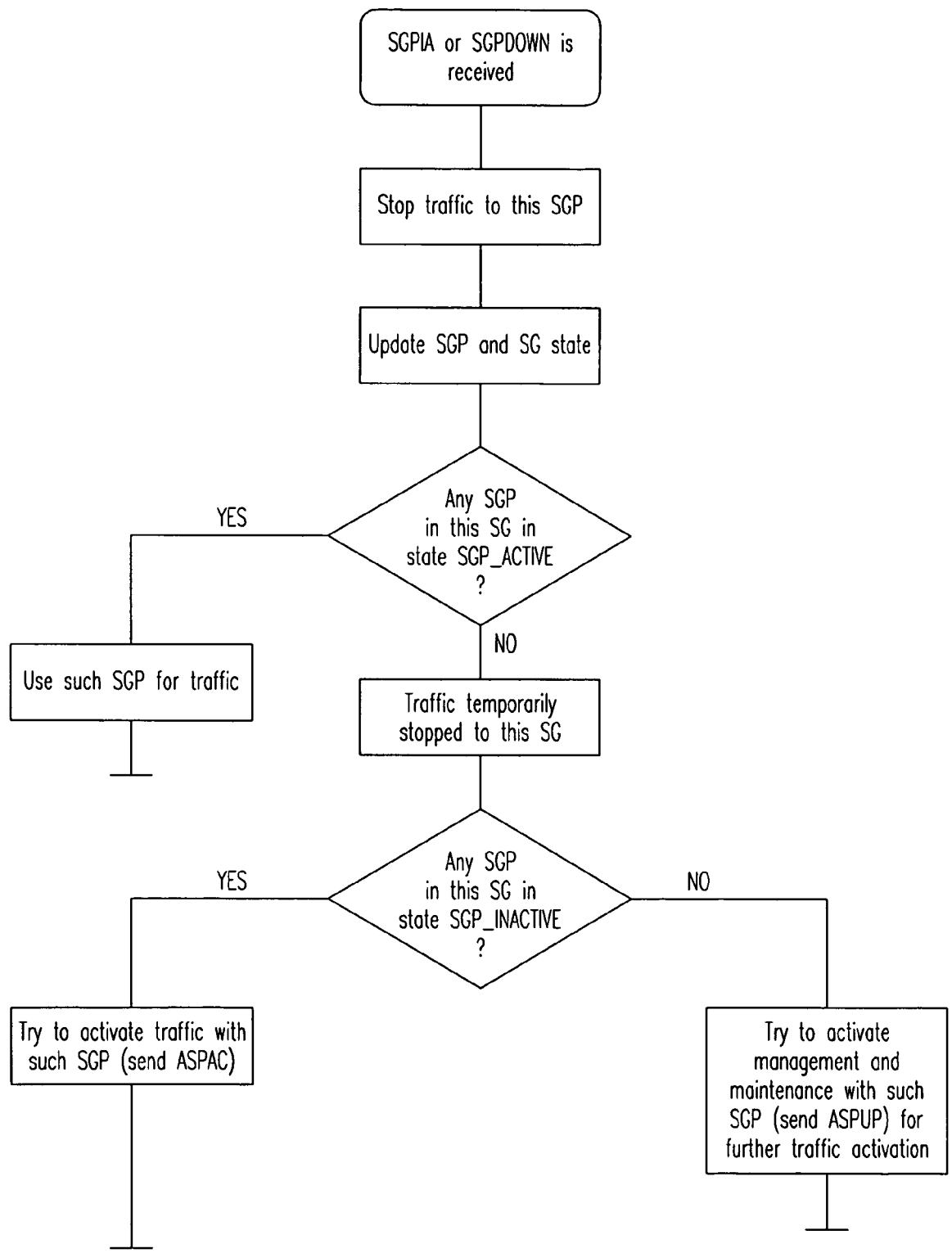
FIG. 12 Shows a flowchart explaining behaviour in an ASP when an unavailability indication is received from a connected SGP according to the first embodiment of this invention.

Besides to this, and as described in FIG. 12, ASP-X will try to find out an alternative for the traffic related messages that could have been sent through SGP-A, but that can no longer be served by such SGP-A.

Figure 8:
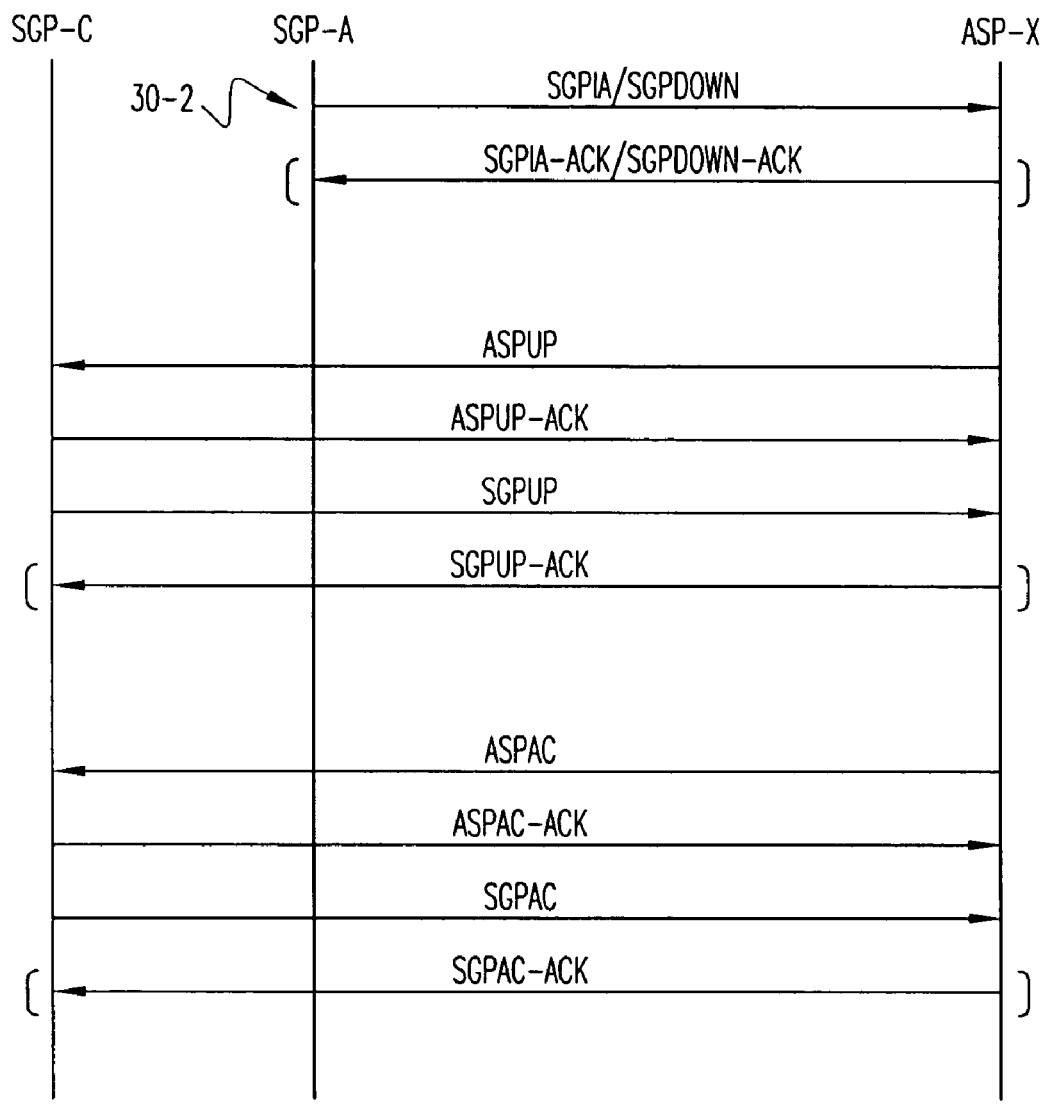
Figure 9:
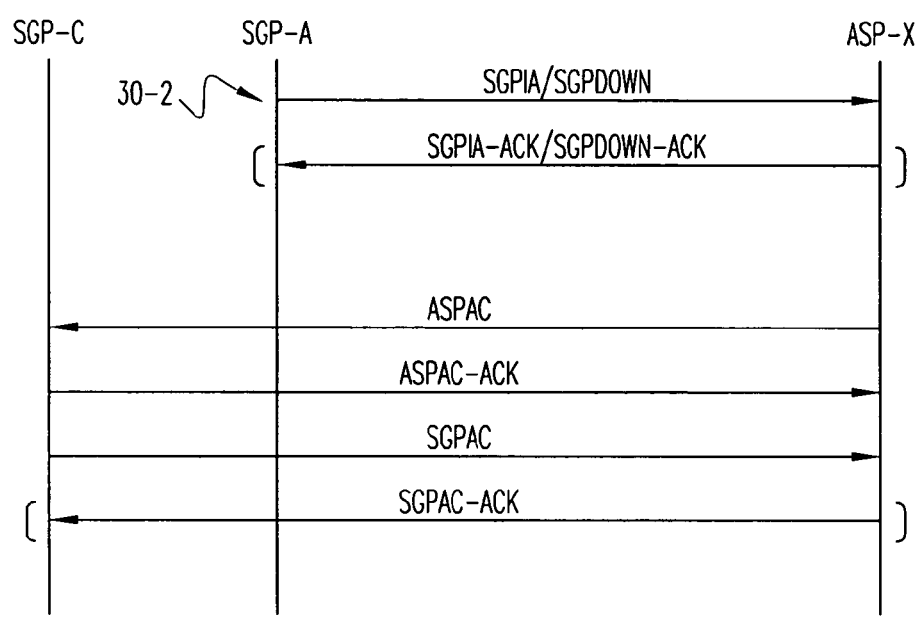

To this extent, ASP-X will either:

use, for further signaling traffic messages related to the affected SG(s), an alternative SGP that can serve such SG(s) whose status "SGP_ACTIVE" in the storage means shows that it is active for traffic;

or, start an activation procedure with an alternative SGP that can serve the affected SG(s), or with the same SGP, consisting of: sending ASPAC to such SGP if its status in the storage means is "SGP_INACTIVE" (as it is shown in FIG. 9), or sending ASPUP followed by ASPAC if its status in the storage means is "SGP_DOWN" (as it is shown in FIG. 8).

Then, assuming a realization wherein confirmed message flows are used for SGP state and traffic maintenance, ASP-X will send the corresponding confirmation message: SGPIA-ACK or SGPDOWN-ACK, back to SGP-A.

If additional information was received in the SGPAC message, then the SGPAC-ACK message can contain the additional information that has been accepted in ASP-X to confirm to SGP-A that it has been accepted.

Some flows that can take place according to the first aspect of the present invention are now described with reference to FIGS. 7, 8 and 9.

Figure 7:
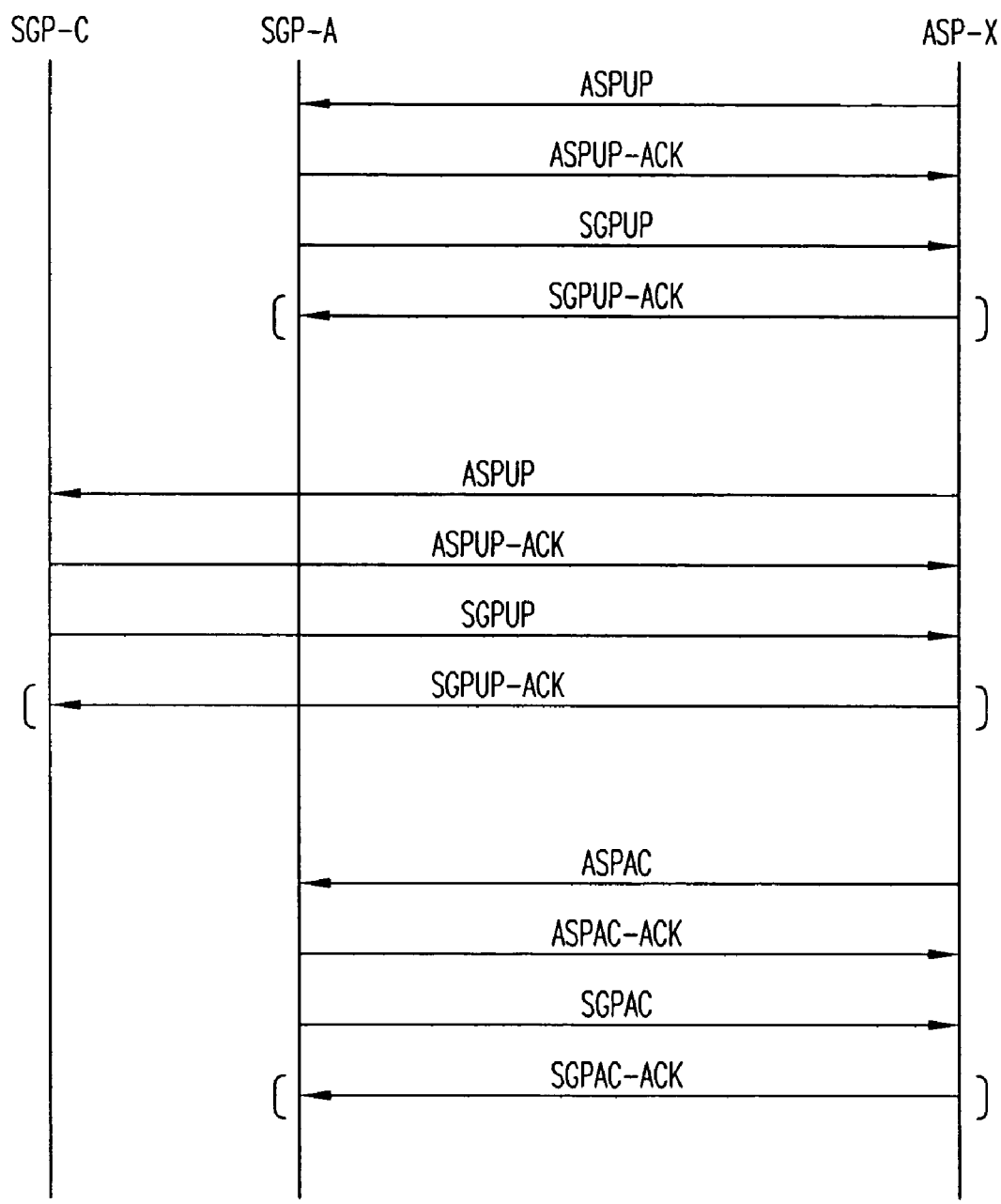

FIG. 7 shows an activation procedure example between one ASP (ASP-X) and two SGPs (SGP-A and SGP-C) that, taking FIG. 4 as a reference for the example, belong to the same SG (1312-GW1).

In this example, when ASP-X is set in operation, it activates exchanging of management and maintenance messages with SGP-A and with SGP-C. This is accomplished by the exchanging of message flows: ASPUP/ASPUP-ACK and SGPUP/SGPUP-ACK.

After these message flows take place, ASP-X activates exchanging of signaling traffic messages with SGP-A only. So, in this example, all traffic related to the SG 1312-GW1 referenced in FIG. 4, will be sent from ASP-X only to SGP-A (among all other possible connected SGPs).

The example shown in FIG. 7 does not preclude any other procedure; for instance, ASP-X could have activated for traffic also to SGP-C; wherein further traffic to be sent related to this concrete SG (1312-GW1), could further be shared between both SGPs ("load-sharing" traffic handling mode), or distributed to only one of them ("override" traffic handling mode).

FIGS. 8 and 9 show two different flows that take place as a consequence to the actions taken in an ASP (ASP-X) upon reception of an SGP traffic maintenance unavailability message (SGPIA), or upon reception of an SGP state maintenance unavailability message (SGPDOWN).

In these examples, ASP-X does not have any other SGP in status "SGP_ACTIVE" where to send further signaling traffic messages related to this SG that became inoperative.

In the example shown in FIG. 8, no SGP that could serve the affected SG is found in ASP-X in status "SGP_INACTIVE"; so an activation procedure consisting on sending first ASPUP (that will be followed by subsequent sending of ASPAC) towards SGP-C is started.

In the example shown in FIG. 9 (that could be an example of continuation of the example shown in previous FIG. 7), one SGP that could serve the affected SG is found in ASP-X in status "SGP_INACTIVE"; so an activation procedure consisting on sending first ASPAC to SGP-C is started.

The logic flow in an ASP to perform such actions above, will be later described in detail with reference to FIG. 12.

Figure 10:
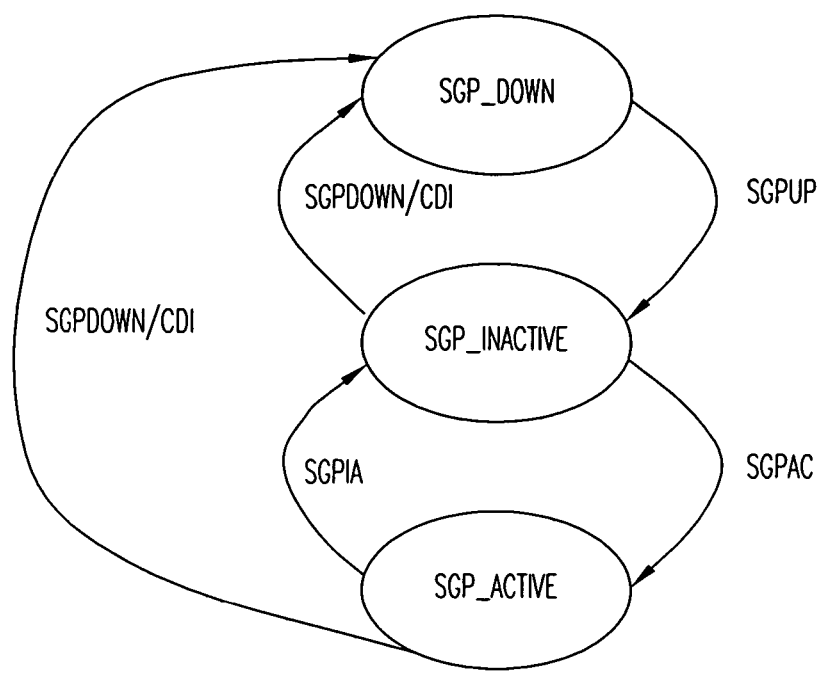
FIGS. 10 and 11 Show status transition diagram reflecting, in an ASP, SGP and SG status, driven by information received from SGP(s) according to the first embodiment of this invention.
Figure 11:
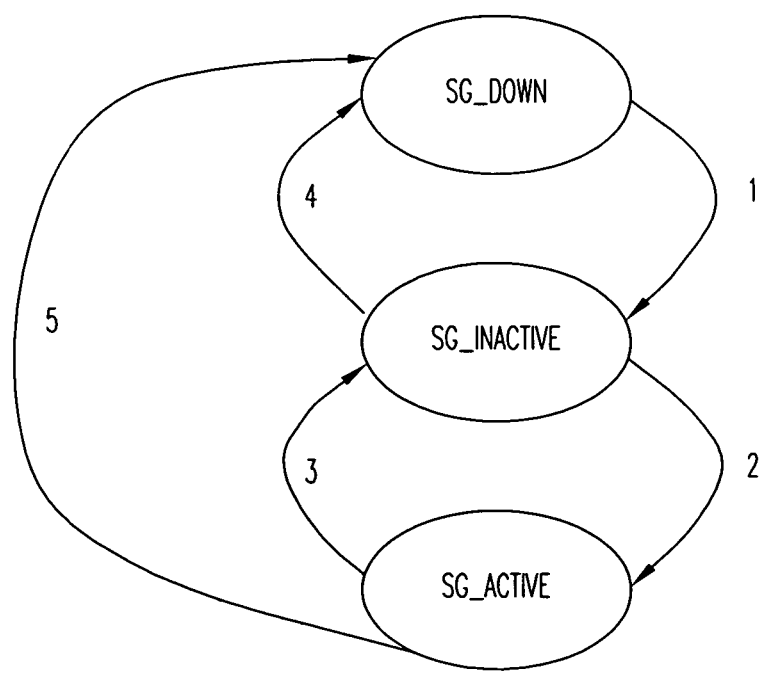

FIGS. 10 and 11 show, respectively, the status-machine transition diagram for SGP status and SG status that will take place in the aforementioned storage means in an ASP (64 in FIG. 5) upon reception of SGP state maintenance or traffic maintenance messages in such ASP.

At this point, it shall be noticed that the status of a certain SGP or the status of a certain SG can have different values in different ASPs. So, the status-machine transition diagrams of FIGS. 10 and 11, as well as the explanations below, shall be understand as related to pertaining to a certain ASP which is the one receiving and processing the messages and events described below.

FIG. 10 shows status-machine transition diagram for SGP states:

For a given SGP, there will be an initial status "SGP_DOWN" marked in a given ASP. This status will also set upon reception of an SGPDOWN message from a connected SGP in such ASP, regardless the previous status of such SGP.

While in this status, only state-of-the-art UA management messages to/from such SGP, and new (in this invention) SGP state maintenance messages from such SGP are allowed.

When, by means of present state-of-the-art techniques, a "communication down indication" (CDI) is received the local UA layer within an ASP from the local SCTP-layer within such ASP, referring to a certain SCTP-association with a given SGP, then the SGP status of such SGP will also be set to "SGP_DOWN" in such ASP.

For a given SGP, an status "SGP_INACTIVE" will be marked in a given ASP when an SGPUP message is received from such SGP in such ASP and the previous status of such SGP was "SGP_DOWN" in such ASP. Also an status "SGP_INACTIVE" will be marked if an SGPIA message is received and the previous status of such SGP was "SGP_ACTIVE".

While in this status, state-of-the-art UA messages, except signaling traffic messages (transfer messages), are allowed to/from such SGP. While in this status, also new (in this invention) SGP state maintenance and SGP traffic maintenance messages will be allowed.

For a given SGP, an status "SGP_ACTIVE" will be marked in a given ASP when an SGPAC message is received from such SGP in such ASP and the previous status of such SGP was "SGP_INACTIVE" in such ASP.

While in this status, all state-of-the-art UA messages, as well as new (in this invention) SGP state maintenance and SGP traffic maintenance messages will be allowed.

FIG. 11 shows status-machine transition diagram for SG status:

For a given SG, there will be an initial status "SG_DOWN" marked in a given ASP. This status will also set if all SGP(s) pertaining to such SG are in status "SGP_DOWN" in such ASP, or if the latest (or only) SGP pertaining (serving) to such SG changes from "SGP_ACTIVE" to "SGP_DOWN" (5), or changes from "SGP_INACTIVE" to "SGP_DOWN" (4) in such ASP.

For a given SG, an status "SG_INACTIVE" will be marked in a given ASP if no SGP pertaining to such SG is in status "SGP_ACTIVE" in such ASP and, at least, one SGP pertaining to such SG is in status "SGP_INACTIVE".

Therefore, when the latest SGP which is in status "SGP_ACTIVE" in an ASP for a given SG, changes to "SGP_INACTIVE" (3) in such ASP, or when one SGP pertaining to such SG is in status "SGP_DOWN" and changes to "SGP_INACTIVE" (1) while no other SGP is in status "SGP_ACTIVE" or "SGP_INACTIVE" for such SG in such ASP, then the SG status for such SG will be changed to "SG_INACTIVE" in such ASP.

For a given SG, an status "SG_ACTIVE" will be marked if, at least, one SGP pertaining to such SG is in status "SGP_ACTIVE" in such ASP.

Therefore, when one SGP pertaining to such SG is in status "SGP_INACTIVE" and changes to "SGP_ACTIVE" (2) while no other SGP is in status "SGP_ACTIVE" for such SG in such ASP, then the SG status for such SG will be changed to "SG_ACTIVE" in such ASP.

FIG. 12 shows a flowchart explaining behaviour in an ASP when an unavailability message SGPIA or SGPDOWN is received from a connected SGP.

Previously cited figures: FIG. 8 and FIG. 9, show different message flows complementary to this flowchart.

When an ASP (e.g.: ASP-X) receives an SGPIA or an SGPDOWN message from an SGP (e.g.: SGP-A), first, if its status was "SGP_ACTIVE" it has to stop traffic (signaling traffic messages) towards such SGP and do not expect receive any traffic (signaling traffic messages) coming from such SGP.

Then, after updating the status for the sending SGP and updating, if proceeds, the status of the affected SG(s), the receiving ASP will have to fetch in the storing means (64) an alternative SGP (e.g.: SGP-C) that is currently serving, or can serve, the SG(s) that became unattended by the sending SGP (SGP-A).

If such alternative SGP is found and its status is "SGP_ACTIVE", then such SGP shall, from now, be used for signaling traffic messages related to such affected SG(s).

Otherwise, the sending of signaling traffic messages related to the affected SG(s) is temporarily stopped until the receiving ASP (ASP-X) starts and complete an activation procedure towards one (or more) alternative SGP(s) that can serve traffic related to the affected SG(s) (i.e.: SGP(s) that are configured to serve such SG(s) that became unattended).

At this point, it shall be noticed that the SGP that became unavailable for traffic (SGP-A) can be among the alternative SGP(s) that can be tried to be activated from the receiving ASP (ASP-X).

The activation procedure started from the receiving ASP (ASP-X) will depend on the current status of the alternative SGP(s) that can serve traffic for the affected SG(s):

If the status of the alternative SGP is "SGP_INACTIVE", then the ASP (ASP-X) will send an ASPAC message to such SGP (SGP-C) for requesting traffic activation. Then, if the SGP (SGP-C) is ready for traffic it will answer back with ASPAC-ACK followed by SGPAC. The corresponding message flow for this case is shown in FIG. 9.

If the status of the alternative SGP is "SGP_DOWN", then the ASP (ASP-X) will first send an ASPUP message to such SGP (SGP-C). Then, if the SGP (SGP-C) is ready for management and maintenance it will answer back with ASPUP-ACK followed by SGPUP. Next the ASP (ASP-X) will send an ASPAC message to such SGP (SGP-C) for requesting traffic activation. Then, if the SGP (SGP-C) is ready for traffic it will answer back with ASPAC-ACK followed by SGPAC. The corresponding message flow for this case is shown in FIG. 8.

Now, the second embodiment of this invention, wherein an ASP sends to one or more connected SGPs notifications related to the status concerning to one or more SGs such SGPs are serving or are configured to serve (SG status notifications), will be detailed with reference to FIGS. 13 to 17.

This second embodiment is based on the first embodiment of this invention; since the SG status notifications that, according to this second embodiment, are sent from an ASP to one or more SGPs, are based on the knowledge in such ASP of SGP availability events received from the connected SGPs, by means of SGP state maintenance and/or SGP traffic maintenance notifications, that affect to one or more SGs served by these SGPs; being the sending of such SGP availability events (from SGP to ASP) concerning to the first embodiment of this invention.

To accomplish with the features inherent to this embodiment, besides managing the SGP state maintenance notifications and SGP traffic maintenance notifications (according to the first embodiment), ASP-X is in charge of further accessing the resultant information stored in the storage means within such ASP (64) in order to send SG status notification message(s) (NOTIFY) to the appropriate SGP(s) enclosing the appropriate notified status content (NSC) in the NOTIFY.

Figure 13:
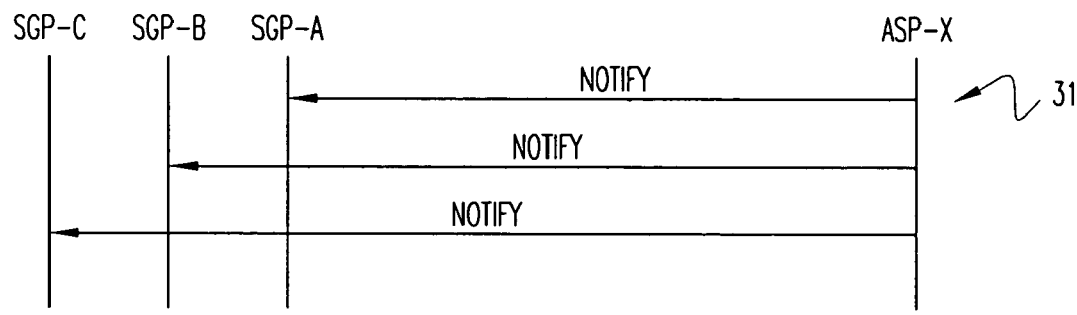
FIGS. 13, 14 and 15 Show different interworking flows for the second embodiment of this invention, wherein an ASP notifies one or more SGPs about the status concerning the SG(s) such SGP(s) is (are) serving.

FIG. 13 shows a general view of the message flows that can take place according to this second embodiment.

In such figure, it is assumed that there are three SGPs (named SGP-A, SGP-B and SGP-C in the drawing) connected to an ASP (ASP-X), being such SGPs configured to serve to one or more SGs each, and being a certain SG served by one or more of these SGPs.

The intention of FIG. 13 is to show that, upon detection of a change in the status of one or more SGs served by any or all SGPs connected to a given ASP (represented by 31), such ASP can send SG status notification messages (NOTIFY) to any or all SGPs connected to it that are serving, or are configured to serve, to the affected SG(s).

The detailed behaviour in an ASP for sending the SG status notification messages (NOTIFY) to one or more connected SGPs, as well as the content of NOTIFY messages and further behaviour in the receiving SGP(s), will hereinafter be detailed with reference to FIGS. 14 to 17.

Figure 14:
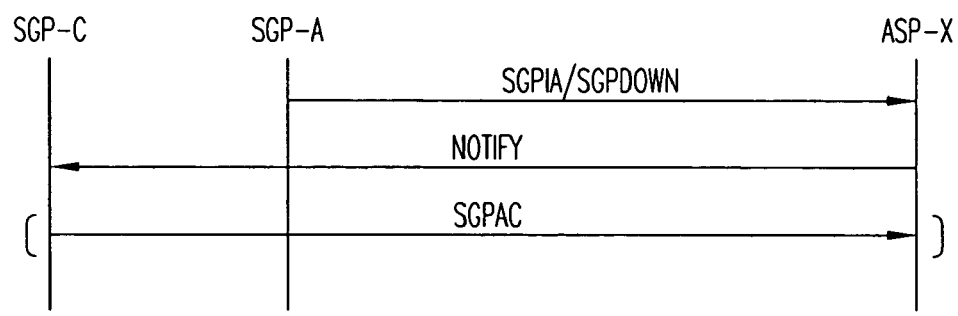

When, due to any condition that, according to the first embodiment of this invention, makes an ASP to change the status of one or more SGs to "SG_INACTIVE" or "SG_DOWN" (only reception of SGPIA or SGPDOWN is shown, as an example in FIG. 14, although, as referred previously, reception from the local SCTP-layer of a "communication down indication", or CDI, can cause also a change to "SG_DOWN", due to a change in an SGP), then such ASP will send a notification (NOTIFY) with notified status indicating "SG inactive" as notified status content (NSC) to all Signaling Gateway Processes (SGPs) connected to it that are configured to serve such SG and that are in an status different from "SGP_DOWN".

Figure 17:
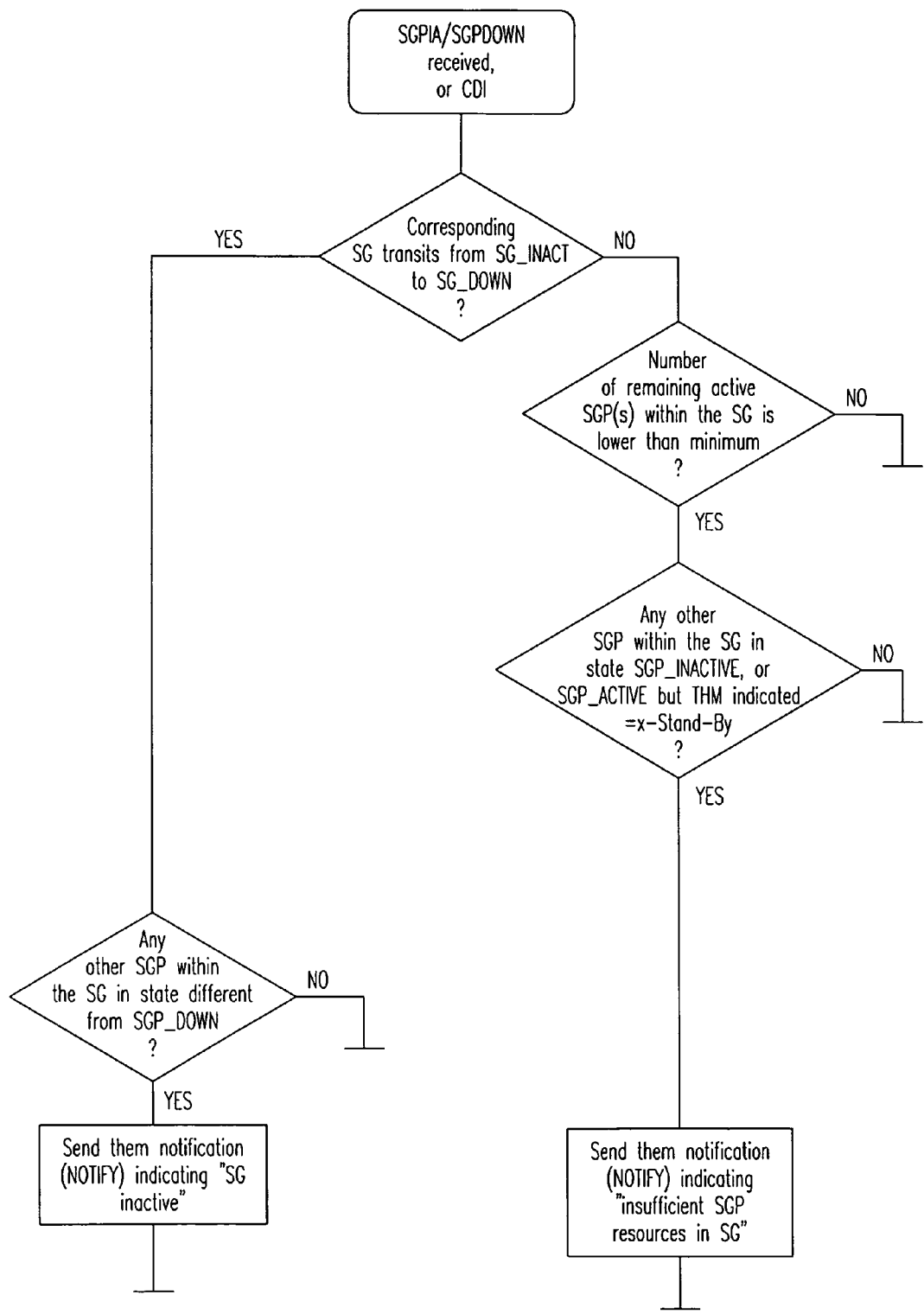

The message flow showing an example of this function is shown in FIG. 14, while flowchart shown in FIG. 17 shows the behaviour in an ASP related to this function.

In the example shown in FIG. 14, that takes as example a previous shown case wherein two SGPs: SGP-A and SGP-C, belongs to the same SG (FIG. 4), the NOTIFY message is sent to SGP-C indicating "SG inactive" in the NSC.

At this point, it shall be noticed that, even though not shown in the FIG. 14, if SGP-A had sent an SGPIA message, the NOTIFY message would have been sent also to SGP-A.

The NOTIFY message with NSC indicating "SG inactive" sent in this case, can contain a set of additional information (AI) elements that identify the SG(s) the NOTIFY message concerns, among the SG(s) the receiving SGP is configured to serve. Being such concerned SG(s)

identified by the inclusion in the message of, at least, one of the following elements per concerned SG, or any combination thereof:
- a Signaling Gateway Identifier (SGI);
- a routing information element (RIE) among:
- a Destination Key (DK), a Destination Context (DC), one or more Interface Identifiers (IIs), or any combination of RIE thereof.

The additional information in the NOTIFY message with NSC indicating "SG inactive" sent in this case, can convey also an ASCII information string (AIS) containing miscellaneous text information associated to this message.

When an SGP receives a NOTIFY message with NSC indicating "SG inactive", further actions will be determined by implementation options in such SGP.

Taking as an example FIG. 14, SGP-C can, depending on implementation options:
- take no further actions (although further actions, such as inform to a potential event log system about this event, are also possible, but are outside the scope of this invention);
- or send an SGP active-notification (SGPAC) to such ASP, the SGPAC indicating a traffic handling mode (THM) different from "override-stand-by" and "load-sharing-standby", or no THM; if the internal status of such SGP allows in that moment the processing of traffic related messages related to the concerned SG(s), and if it had previously sent an SGPAC to such ASP indicating a THM "override-stand-by" or "load-sharing-standby" as an answer to a previous ASP active notification (ASPAC) received from such ASP;
- or wait for a further ASP active notification (ASPAC) from such ASP in order to send an SGP active-notification (SGPAC) to such ASP indicating a traffic handling mode (THM) different from "override-stand-by" and "load-sharing-standby", or no THM; if it had not yet received an ASPAC from such ASP;

If no additional information is received in the NOTIFY message related to the affected SG(s), then the SG(s) that will be considered as affected by the NOTIFY message, for taking the aforementioned further actions, will be either:
- all SG(s) such SGP has been configured to serve, if it has been manually configured for a certain set of SG(s);
- or all the SG(s) such SGP is able to serve, if the SG has not been manually configured for specific SG(s).

When, due to any condition that, according to the first embodiment of this invention, makes an ASP to change the status of one or more SGs to "SG_ACTIVE" (reception of SGPAC), then such ASP will send a notification (NOTIFY) with notified status indicating "SG active" as notified status content (NSC) to all Signaling Gateway Processes (SGPs) connected to it that are configured to serve such SG and that are in an status different from "SGP_DOWN".

Figure 15:
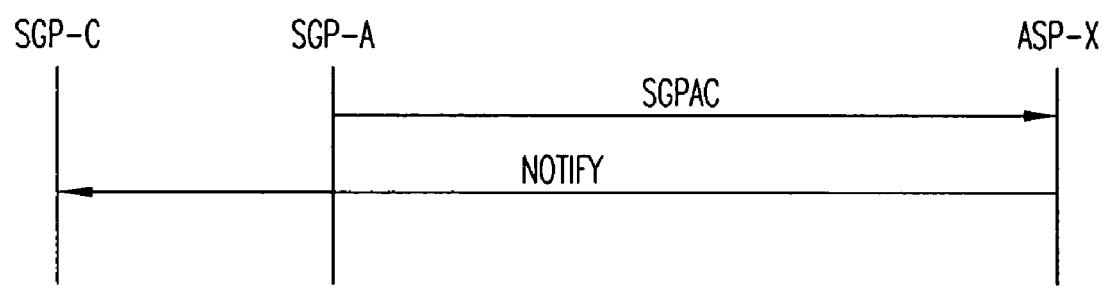
Figure 16:
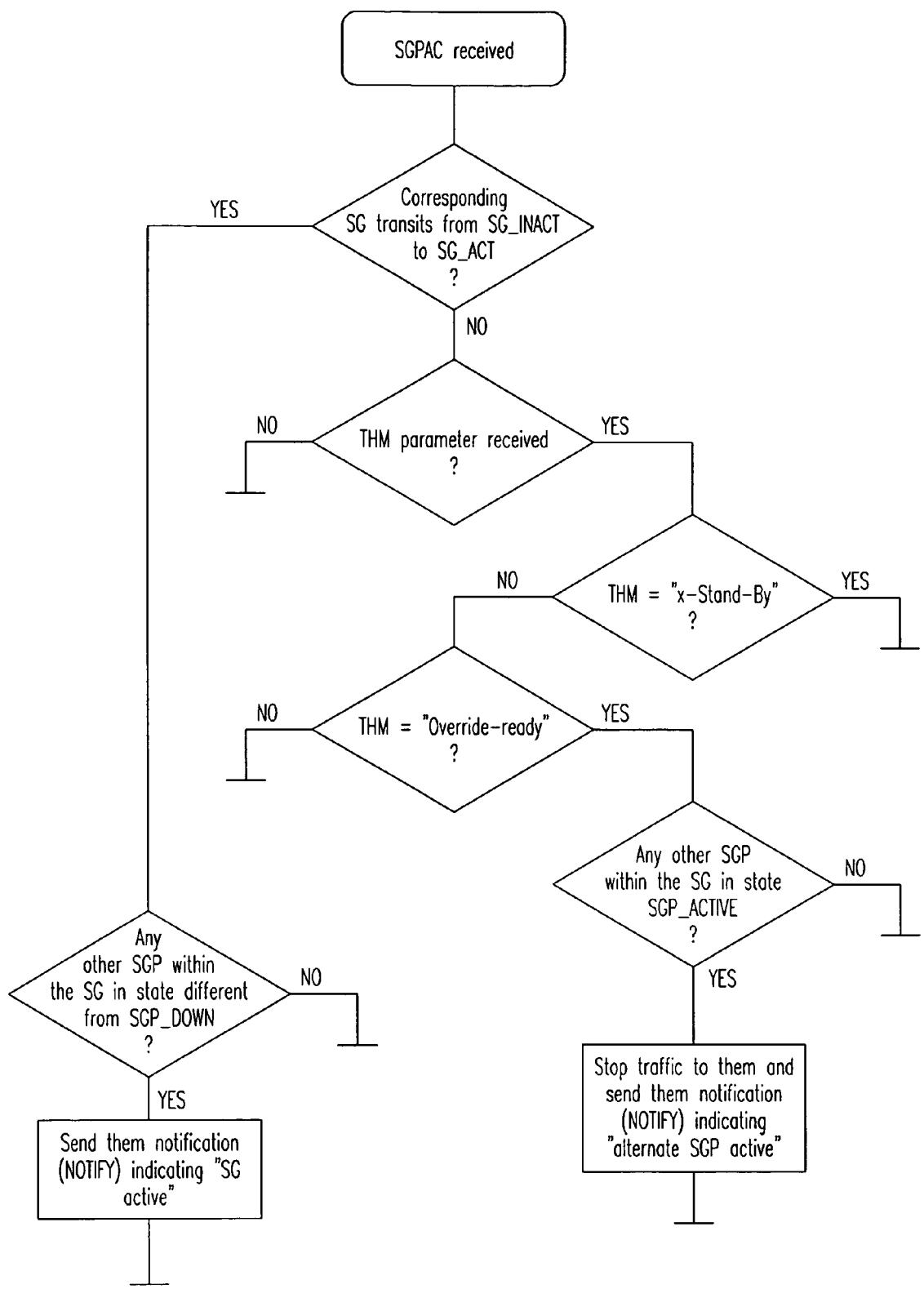
FIGS. 16 and 17 Shows a flowcharts explaining criteria in an ASP for sending SG status notifications to one or more SGPs, according to the second embodiment of this invention.

The message flow showing an example of this function is shown in FIG. 15, while flowchart shown in FIG. 16 shows the behaviour in an ASP related to this function.

In the example shown in FIG. 15, that takes as example a previous shown case wherein two SGPs: SGP-A and SGP-C, belongs to the same SG (FIG. 4), the NOTIFY message is sent to SGP-C indicating "SG active" in the NSC.

At this point, it shall be noticed that, even though not shown in the FIG. 15, since SGP-A has sent an SGPAC message, thus becoming in status "SGP_ACTIVE", the NOTIFY message could also be sent to SGP-A.

The NOTIFY message with NSC indicating "SG active" sent in this case, can contain a set of additional information (AI) elements that identify the SG(s) the NOTIFY message concerns, among the SG(s) the receiving SGP is configured to serve. Being such concerned SG(s) identified by the inclusion in the message of the same elements per concerned SG as cited previously for the NOTIFY message that contained the NSC indicating "SG inactive".

The additional information in the NOTIFY message with NSC indicating "SG active" sent in this case, can convey also an ASCII information string (AIS) containing miscellaneous text information associated to this message.

When an SGP receives a NOTIFY message with NSC indicating "SG active" will, under the scope of this invention, take no further actions (although further actions, such as inform to a potential event log system about this event, are also possible, but are outside the scope of this invention).

When, due to any condition that, according to the first embodiment of this invention, makes an ASP to change the status of an SGPs to "SGP_INACTIVE" or "SGP_DOWN" (only reception of SGPIA or SGPDOWN is shown, as an example in FIG. 14, although, as referred previously, reception from the local SCTP-layer of a "communication down indication", or CDI, can cause also a change to "SGP_DOWN" for a given SGP), and after that, the resultant number of SGP(s) in status "SGP_ACTIVE" is lower than the minimum number of active SGP(s) status in the storage means of such ASP (64) for serving the corresponding affected SG(s); then such ASP will send a notification (NOTIFY), with notified status indicating "insufficient SGP resources active in SG" as notified status content (NSC), to all Signaling Gateway Processes (SGPs) connected to it that are configured to serve such affected SG(s) and that are in an status "SGP_INACTIVE", or that are in an status "SGP_ACTIVE", but that sent an active-notification (SGPAC) indicating for this SG a traffic handling mode (THM) "override-stand-by" or "load-sharing-standby".

The message flow showing an example of this function is shown in FIG. 14, while flowchart shown in FIG. 17 shows the behaviour in an ASP related to this function.

In the example shown in FIG. 14, that takes as example a previous shown case wherein two SGPs: SGP-A and SGP-C, belongs to the same SG (FIG. 4), the NOTIFY message is sent to SGP-C indicating "insufficient SGP resources active in SG" in the NSC.

At this point, it shall be noticed that, even though not shown in the FIG. 14, if SGP-A had sent an SGPIA message, the NOTIFY message would have been sent also to SGP-A.

The NOTIFY message with NSC indicating "insufficient SGP resources active in SG" sent in this case, can contain a set of additional information (AI) elements that identify the SG(s) the NOTIFY message concerns, among the SG(s) the receiving SGP is configured to serve. Being such concerned SG(s) identified by the inclusion in the message of the same elements per concerned SG as cited previously for the NOTIFY message that contained the NSC indicating "SG inactive".

The additional information in the NOTIFY message with NSC indicating "insufficient SGP resources active in SG" sent in this case, can convey also an ASCII information string (AIS) containing miscellaneous text information associated to this message.

When an SGP receives a NOTIFY message with NSC indicating "insufficient SGP resources active in SG", further actions will be determined by implementation options in such SGP; being such further actions the same as the ones previously described for reception in an SGP of a NOTIFY message with NSC indicating "SG inactive".

If no additional information is received in the NOTIFY message related to the affected SG(s), then the SG(s) that will be considered as affected by the NOTIFY message, for taking the aforementioned further actions, will be either:

all SG(s) such SGP has been configured to serve, if it has been manually configured for a certain set of SG(s);

or all the SG(s) such SGP is able to serve, if the SG has not been manually configured for specific SG(s).

When an ASP receives, either:

an active-notification (SGPAC) indicating a traffic handling mode (THM) "override" from an SGP which was in status "SGP_INACTIVE";

or an active-notification (SGPAC) from an SGP which is already in status "SGP_ACTIVE", that had indicated a traffic handling mode (THM) except "override", and now indicates a THM "override";

then such ASP will send a notification (NOTIFY), with notified status indicating "alternate SGP active" as notified status content (NSC), to all Signaling Gateway Processes (SGPs) connected to it that are serving the affected SG(s) and that are in an status "SGP_ACTIVE"; indicating to the SGP that it will no longer receive traffic from this ASP related to the affected SG(s) it was serving.

The message flow showing an example of this function is shown in FIG. 15, while flowchart shown in FIG. 16 shows the behaviour in an ASP related to this function.

In the example shown in FIG. 15, that takes as example a previous shown case wherein two SGPs: SGP-A and SGP-C, belongs to the same SG (FIG. 4), the NOTIFY message is sent to SGP-C indicating "alternate SGP active" in the NSC.

The NOTIFY message with NSC indicating "alternate SGP active" sent in this case, can contain a set of additional information (AI) elements that identify the SG(s) the NOTIFY message concerns, among the SG(s) the receiving SGP is configured to serve. Being such concerned SG(s) identified by the inclusion in the message of the same elements per concerned SG as cited previously for the NOTIFY message that contained the NSC indicating "SG inactive".

The additional information in the NOTIFY message with NSC indicating "alternate SGP active" sent in this case, can convey also an ASCII information string (AIS) containing miscellaneous text information associated to this message.

When an SGP receives a NOTIFY message with NSC indicating "alternate SGP active" will, under the scope of this invention, take no further actions: it is just notified from an ASP that will no longer receive signaling traffic messages related to certain SG(s) it is serving (although further actions, such as inform to a potential event log system about this event, are also possible, but are outside the scope of this invention).

The invention claimed is:

1. A method for managing the state maintenance and traffic maintenance between Signaling Gateway Processes (SGPs) and Application Server Processes (ASPs) when a Switched Circuit Network (SCN) signaling is transported over Data Networks between at least one of said SGPs and at least one of said ASPs, said method comprising the steps of:

establishing transport connections in the Data Network using a Transport Protocol between SGPs and ASPs;

allocating specific User Adaptations (UAs) layers in said SGPs and ASPs for adapting the SCN signaling to be transported;

exchanging messages between the UA layers of connected SGPs and ASPs, wherein one Signaling Gateway node (SG) is comprised of the group of SGPs that perform signaling conversion functions for a given set of SCN destinations;

assigning and storing data in the ASPs regarding the configurations of at least one of the SGPs and the SGs;

sending messages from the SGPs to the connected ASPs about the availability of the SGPs for processing at least one of maintenance messages and signaling traffic messages;

obtaining the availability status of the SGPs from said at least one of the maintenance messages and the signaling traffic messages and storing said status in the ASPs;

obtaining the availability status of the SGs from the individual status of the SGPs that comprise each SG and storing said status in the ASPs; and using said status information and said configuration data of the at least one of the SGPs and the SGs to manage the connectivity with destinations in the SCN.

2. A method according to claim 1 further comprising the steps of:

assigning and storing in the SGPs Additional Information (AI) regarding the SGs of the configurations of the at least one of the SGPs and the SGs;

including said AI in the at least one of the maintenance messages and the signaling traffic messages.

3. A method according to claim 2 further comprising the step of updating the data regarding the configurations of the at least one of the SGPs and the SGs stored in the ASPs with the AI received from the SGPs in the at least one of the maintenance messages and the signaling traffic messages.

4. A method according to claim 3 wherein said AI includes at least one of the following information elements per SG indicated in the at least one of the maintenance messages and the signaling traffic messages:

(a) a Signaling Gateway Identifier (SGI) uniquely identifying the SG by means of one of a numerical alias and a text alias;

(b) a Routing Information Element (RIE) characterizing the SG by the destinations in the SCN that can be reached through the SGPs serving said SG, including at least one of: (i) a destination key (DK) including at least one of a set of addresses and routing information used specifically in the SCN that identifies at least one destination signaling end-point in the SCN; (ii) a destination context (DC) uniquely identifying, by means of one of a numerical alias and a text alias, a destination key (DK); (iii) an Interface Identifier (II) uniquely identifying, by means of one of a numerical alias and a text alias, a physical interface (PHI) with the SCN; and (c) a traffic handling mode (THM) field characterizing at least one of how traffic shall be balanced and how traffic shall be handled between the SGPs belonging to the SG.

5. A method according to claim 1 further comprising the step of sending acknowledgement messages from the ASPs to the SGPs related to any of the at least one of the maintenance messages and the signaling traffic messages received in the ASPs from the SGPs.

6. A method according to claim 1 further comprising the step of sending notifications from the ASPs to the SGPs related to the status of the SGs corresponding to the configurations of the at least one of the SGPs and the SGs.

7. A method according to claim 6 further comprising the step of using said notifications in the SGPs for further managing the traffic for said SGs.

8. A method according to claim 1 wherein said Transport Protocol is the Stream Control Transmission Protocol (SCTP).

9. A method according to claim 1, wherein said Transport Protocol is the Transmission Control Protocol (TCP).

10. A method according to claim 1, wherein said Transport Protocol is the User Datagram Protocol (UDP).

11. A method according to claim 8, wherein said User Adaptation layer is adapting one of the SS#7's Message Transfer Part layer-3 (MTP3) protocol (M3UA), the SS#7's Message Transfer Part layer-2 (MTP2) protocol (M2UA), and the SS#7's Signaling Connection Control Part (SCCP) protocol (SUA).

12. A method according to claim 9, wherein said User Adaptation layer is adapting one of the SS#7's Message Transfer Part layer-3 (MTP3) protocol (M3UA), the SS#7's Message Transfer Part layer-2 (MTP2) protocol (M2UA), and the SS#7's Signaling Connection Control Part (SCCP) protocol (SUA).

13. A method according to claim 10, wherein the aforementioned User Adaptation layer is adapting the SS#7's Message Transfer Part layer-3 (MTP3) protocol (M3UA), the SS7's Message Transfer Part layer-2 (MTP2) protocol (M2UA), and the SS#7's Signaling Connection Control Part (SCCP) protocol (SUA).

14. A method according to claims 1, wherein said User Adaptation layer is adapting the Q.921 protocol (IUA).

15. A system for managing the state maintenance and traffic maintenance between Signaling Gateway Processes (SGPs) and Application Server Processes (ASPs) when a Switched Circuit Network (SCN) signaling is transported over Data Networks between at least one of said SGPs and at least one of said ASPs by means of establishing transport connections in the Data Network using a Transport Protocol between SGPs and ASPs, allocating specific User Adaptations (UAs) layers in said SGPs and ASPs for adapting the SCN signaling to be transported and exchanging messages between the UA layers of connected SGPs and ASPs, wherein one Signaling Gateway node (SG) is comprised of the group of SGPs that perform signaling conversion functions for a given set of SCN destinations, said system comprising:
   SGPs each having processing and protocol means to send messages to connected ASPs about the availability of the SGP for processing at least one of maintenance messages and signaling traffic messages; and
   ASPs having protocol means for receiving said at least one of maintenance messages and signaling traffic messages; storage means for storing the availability status of, and data regarding the configurations of, the at least one of the SGPs and the SGs; processing means for obtaining said availability status from said at least one of maintenance messages and signaling traffic messages; and processing and protocol means for using said status information and said configuration data of the at least one of the SGPs and the SGs to manage the connectivity with destinations in the SCN.

16. A system according to claim 15 further comprising:
   storage means in each SGP for storing Additional Information (AI) regarding the SGs of the configurations of the at least one of the SGPs and the SGs;
   configuration means for assigning values to said AI; and
   processing means for including said AI in said at least one of maintenance messages and signaling traffic messages.

17. A system according to claim 16 further comprising processing means in each ASP for updating the data regarding the configuration of the at least one of the SGPs ands the SGs stored in said storage means with the AI received from the SGPs in said at least one of maintenance messages and signaling traffic messages.

18. A system according to claim 17 wherein said AI includes at least one of the following information elements per SG indicated in the at least one of maintenance messages and signaling traffic messages:
   (a) a Signaling Gateway Identifier (SGI) uniquely identifying the SG by means of one of a numerical alias and a text alias;
   (b) a Routing Information Element (RIE) characterizing the SG by the destinations in the SCN that can be reached through the SGPs serving said SG, including at least one of: (i) a destination key (DK) including at least one of a set of addresses and routing information used specifically in the SCN that identifies at least one destination signaling end-point in the SCN; (ii) a destination context (DC) uniquely identifying, by means of one of a numerical alias and a text alias, to a destination key (DK); (iii) an Interface Identifier (II) uniquely identifying, by means of one of a numerical alias and a text alias, a physical interface (PHI) with the SCN; and
   (c) a traffic handling mode (THM) field characterizing at least one of how traffic shall be balanced and how traffic shall be handled between the SGPs belonging to the SG.

19. A system according to claim 15 further comprising means in the ASPs for sending acknowledgement messages to the SGPs related to the at least one of maintenance messages and signaling traffic messages received in said ASP from said SGP.

20. A system according to claim 15 further comprising processing and protocol means in the ASPs for sending notifications to the SGPs related to the status of the SGs corresponding to the configurations of the at least one of the SGPs and the SGs.

21. A system according to claim 20 further comprising processing means in the SGPs for further managing the traffic for said SGs.

22. A system according to claim 15, wherein said Transport Protocol is the Stream Control Transmission Protocol (SCTP).

23. A system according to claim 15, wherein said Transport Protocol is the Transmission Control Protocol (TCP).

24. A system according to claim 15 wherein said Transport Protocol is the User Datagram Protocol (UDP).

25. A system according to claim 15 wherein the aforementioned User Adaptation layer is adapting the SS#7's Message Transfer Part layer-3 (MTP3) protocol (M3UA).

26. A system according to claim 15 wherein the aforementioned User Adaptation layer is adapting the SS#7's Message Transfer Part layer-2 (MTP2) protocol (M2UA).

27. A system according to claim 15 wherein the aforementioned User Adaptation layer is adapting the SS#7's Signaling Connection Control Part (SCCP) protocol (SUA).

28. A system according to claim 15 wherein the aforementioned User Adaptation layer is adapting the Q.921 protocol (IUA).

* * * * *

UNITED STATES PATENT AND TRADEMARK OFFICE
CERTIFICATE OF CORRECTION

PATENT NO. : 7,103,037 B2
APPLICATION NO. : 10/155439
DATED : September 5, 2006
INVENTOR(S) : Roque et al.

It is certified that error appears in the above-identified patent and that said Letters Patent is hereby corrected as shown below:

In Column 2, Line 8, delete "application" and insert -- applications --, therefor.

In Column 2, Line 34, after "across" delete "of".

In Column 3, Line 38, after "across" delete "of".

In Column 2, Line 40, delete "processes" and insert -- process --, therefor.

In Column 2, Line 40, delete "implements," and insert -- implement, --, therefor.

In Column 2, Line 50, after "Besides" delete "to".

In Column 3, Line 7, after "interact" insert -- with --.

In Column 3, Line 65, delete "identifies" and insert -- identify --, therefor.

In Column 4, Line 4, after "serving" delete "to".

In Column 4, Line 12, after "represent" delete "to".

In Column 5, Line 64, after "though" delete "in".

In Column 5, Line 65, after "standards" delete ",".

In Column 6, Line 10, after "case" delete "of".

In Column 7, Line 39, after "concerning" delete "to".

In Column 8, Line 14, delete "acknowledgements" and insert -- acknowledgement --, therefor.

In Column 8, Line 42, delete "result" and insert -- results --, therefor.

In Column 12, Line 59, delete "-Y" and insert -- ASP-Y --, therefor.

In Column 16, Line 10, delete "(ToI)" and insert -- (ToI) --, therefor.

In Column 16, Line 11, delete "ToI" and insert -- ToI --, therefor.

In Column 16, Line 15, delete "ToI" and insert -- ToI --, therefor.

UNITED STATES PATENT AND TRADEMARK OFFICE
CERTIFICATE OF CORRECTION

PATENT NO. : 7,103,037 B2 Page 2 of 2
APPLICATION NO. : 10/155439
DATED : September 5, 2006
INVENTOR(S) : Roque et al.

It is certified that error appears in the above-identified patent and that said Letters Patent is hereby corrected as shown below:

In Column 16, Line 20, delete "ToI" and insert -- ToI --, therefor.

In Column 18, Line 57, delete "state-or-the-art" and insert -- state-of-the-art --, therefor.

In Column 21, Line 13, delete "(ToI)" and insert -- (ToI) --, therefor.

In Column 21, Line 14, delete "ToI" and insert -- ToI --, therefor.

In Column 21, Line 17, delete "ToI" and insert -- ToI --, therefor.

In Column 35, Line 26, in Claim 14, delete "claims" and insert -- claim --, therefor.

In Column 36, Line 3, in Claim 17, delete "ands" and insert -- and --, therefor.

Signed and Sealed this

Eighteenth Day of December, 2007

JON W. DUDAS
*Director of the United States Patent and Trademark Office*